「United States Patent」「Tripathi et al.」

(10) Patent No.: US 10,044,728 B1
(45) Date of Patent: Aug. 7, 2018

(54) ENDPOINT SEGREGATION TO PREVENT SCRIPTING ATTACKS

(71) Applicant: Amazon Technologies, Inc., Seattle, WA (US)

(72) Inventors: Aridaman Tripathi, Bengaluru (IN); Thibault Candebat, Saint Germain en Laye (FR)

(73) Assignee: Amazon Technologies, Inc., Seattle, WA (US)

( * ) Notice: Subject to any disclaimer, the term of this patent is extended or adjusted under 35 U.S.C. 154(b) by 234 days.

(21) Appl. No.: 14/792,003

(22) Filed: Jul. 6, 2015

(51) Int. Cl.
*H04L 29/06* (2006.01)
*H04L 29/08* (2006.01)

(52) U.S. Cl.
CPC ........ *H04L 63/105* (2013.01); *H04L 63/0245* (2013.01); *H04L 63/101* (2013.01); *H04L 67/10* (2013.01)

(58) Field of Classification Search
CPC . H04L 63/0245; H04L 63/101; H04L 63/105; H04L 67/10; G06F 9/44526
See application file for complete search history.

(56) References Cited

U.S. PATENT DOCUMENTS

| | | | | |
|---|---|---|---|---|
| 2005/0198692 A1* | 9/2005 | Zurko | ................... | G06F 21/563 726/24 |
| 2008/0046884 A1* | 2/2008 | Shin | ................... | G06F 9/44526 717/177 |
| 2009/0119769 A1* | 5/2009 | Ross | ................... | G06F 21/55 726/13 |
| 2013/0031470 A1 | 1/2013 | Daly, Jr. et al. | | |
| 2015/0135256 A1* | 5/2015 | Hoy | ................... | H04L 63/20 726/1 |
| 2016/0085863 A1 | 3/2016 | Allen et al. | | |
| 2016/0182537 A1* | 6/2016 | Tatourian | ............ | H04L 63/1416 726/23 |
| 2016/0323309 A1* | 11/2016 | Sethi | ................... | H04L 63/101 |

OTHER PUBLICATIONS

U.S. Appl. No. 14/792,010, filed Jul. 6, 2015, Aridaman Tripathe et al.

* cited by examiner

*Primary Examiner* — Hadi S Armouche
*Assistant Examiner* — Alexander R Lapian
(74) *Attorney, Agent, or Firm* — Robert C. Kowert; Meyertons, Hood, Kivlin, Kowert & Goetzel, P.C.

(57) ABSTRACT

A secure and efficient technique to prevent cross-site scripting attacks based on segregating the content within a given content page among independent endpoints, or servers, where static content is provided from one endpoint and active content is provided from another endpoint. Together, the different endpoints make up an endpoint segregation system. Further, security features of HTTP/HTML are used to restrict sources from which active content may be executed according to the division of static and active content among the endpoints of the endpoint segregation system.

20 Claims, 16 Drawing Sheets

ENDPOINT SEGREGATION TO PREVENT SCRIPTING ATTACKS

BACKGROUND

For businesses to be competitive online, a business must provide a feature rich browsing experience for their content sites and provide content pages that include both static and active elements. Often, the active elements allow for a user to provide text input, which in different cases may be sent to be processed remotely at a web server providing the content page. In the case where a user is bad actor, the user may provide as input malicious scripting data, which when executed on the web server, may cause the web server to provide security compromised content pages to multiple other users. Such an instance is a cross-site scripting attack. Further, cross-site scripting is a widely prevalent web application security vulnerability.

Traditional approaches for preventing cross-site scripting rely on either output encoding or input filtering. Input validation requires developers to perform whitelist filtering of untrusted data at the point that the data enters the trusted system. However, some problems with this approach are that, outside of environments where data gathering and consumption are performed within a same application, whitelisting does not scale to large applications. Further, complex types of data, such as free text or rich text, may validly include characters that may trigger a cross-site scripting attack. Blacklist filters are ineffective due to new attacks being constantly created. Output encoding requires developers to encode data when it is injected into a web page that is to be rendered in a web browser or other client application. Output encoding also requires that developers configure application frameworks to encode all data injected into a web page to be encoded by default. However, in complex architectures, content in a web page may come from different sources, which hinders a consistent enforcement of application frameworks.

Recent versions of HTTP and HTML provide for a mechanism, a setting of a content security policy (CSP), to define a whitelist of valid sources from which active content may be executed to render content. However, a straightforward use of CSP features still leaves security vulnerabilities against cross-site scripting attacks.

Figure 1:
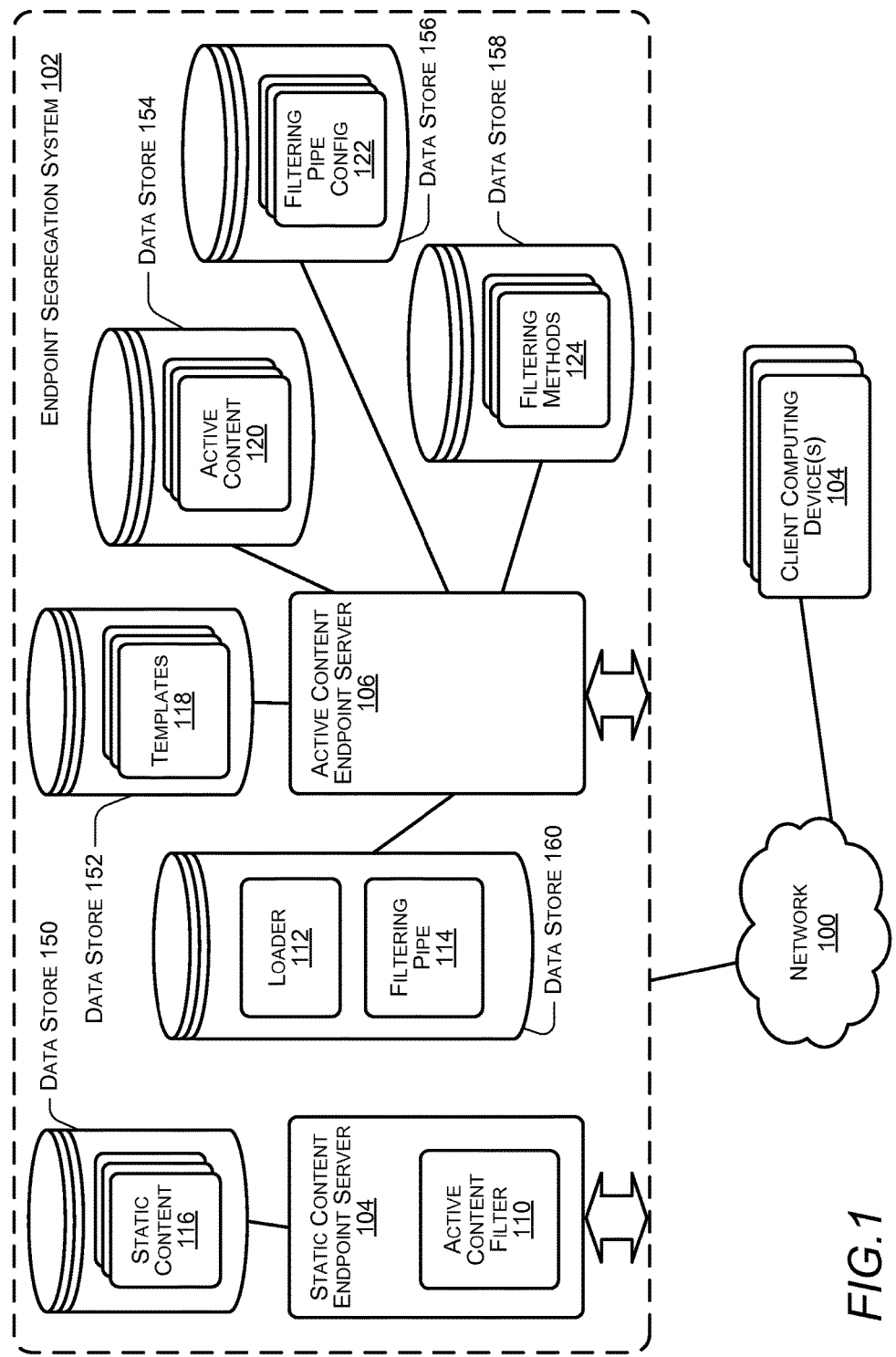
FIG. 1 is a first illustrative architecture depicting an example endpoint segregation system with two endpoint servers according to some implementations.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean inclusive of, but not limited to.

DETAILED DESCRIPTION

The systems and techniques described in this disclosure specify implementations of an endpoint segregation system for preventing cross-site scripting attacks based at least in part on isolating static content in a content page from dynamic content in the content page. An example of static content is content that is not executable, and an example of active content is content that is executable, such as a script. An endpoint segregation system isolates static content for a content page from active content for the same content page—where the static content is served from one endpoint server and active content is served from another, different endpoint server or endpoint servers. Further, active content that is served to a requesting client application is tiered such that communication to a given active content method from a user providing input is restricted to go through a single communication channel before it gets to the given method. Further, this communication channel includes features for filtering any parameters before they are passed to the given method. Together, the static and active content from the segregated endpoint servers serve as a basis for rendering an entire content page.

In one embodiment, the endpoint segregation system may have two endpoint servers, a static content endpoint server and an active content endpoint server. Generally, an endpoint may be a single server or a group of servers or processors, where the one or more servers comprise an addressable entity configured to receive requests for content and respond with content. For example, an endpoint server may be a web server implementing one or more versions of Hypertext Transfer Protocol (HTTP), including a version of HTTP implementing Content Security Policy (CSP). In this way, in response to a request for a content page, an endpoint server may provide content within an HTTP message body and set an indication within an HTTP header specifying a content security policy applicable to the content in the message body, where the content security policy serves to indicate one or more sources from which active content may be downloaded and executed—to the exclusion of any other source. As used throughout this disclosure, a policy setting is synonymous with a content security policy. In some cases, the content security policy indication may be set within the message body, for example, through the use of an HTML tag within HTML content served in the message body. In different embodiments, active content may be JavaScript, Cascading Style Sheets (CSS), Flash, or any other type of content that may be executable, including combinations of different types of active content.

In an example embodiment, an endpoint segregation system may include two endpoint severs, a static content endpoint server and an active content endpoint server. In this example, in a response to a content page request from a client application executing on a client system, the static content endpoint server may provide a page with static content and an instruction to download a loader from the active content endpoint where the loader proceeds to download and execute active content methods. By contrast, traditional web servers typically provide content pages that are complete and include both static and active content such that when rendered on a client system all features of the content page are produced, including interactive features.

In this example, in response to a request for a content page, the static content endpoint server of the endpoint segregation system may provide a page that, if rendered on a client system, without more, would produce an incomplete content page because it would not include active content for generating interactive features. As noted above, the active content that would complete the content page intended to be interactive may be downloaded from the active content server, as is explained in detail below. When the static content from the static content endpoint is rendered in conjunction with the execution of active content from the active content endpoint, the full slate of features of the interactive content page may be provided.

In this example, the information describing how static content and active content work together to generate a complete, interactive content page is stored in a template corresponding to the content page. For example, if an existing content page with both static and active content is being modified for use within the endpoint segregation system, then for each portion of active content removed from the original content page, the template stores information indicating how the active content originally fit within the original content page. For example, if an active content method call to a given code library is made from a given line or location within the original content page, then the template may store the name of the method call, the corresponding library, and the line or position within the original content page. For example, the method call may be a JavaScript method call, and the library may be a standard JavaScript library.

In this way, in this example, the original content page may be split into static content and active content with a template corresponding to the original content page, where the template may be used to determine how the static content and active content work together. For example, a given content page may be mapped to a content page identifier value, where the content page identifier value may be used to determine the template, or templates, corresponding to the given content page of the same content page identifier value. This example endpoint segregation system, with two different endpoint servers is further described below with regard to FIGS. 1-8.

One of the security advantages provided by separating the static content in a content page from active content, where the static content is accessible from a static content endpoint server and the active content is accessible from an active content endpoint server, is that the endpoint segregation system may create a channel, or filtering pipe, through which suspect parameters of a method must go through prior to being passed to the method. While in this embodiment, the functionality of a loader and filtering pipe are segregated into different functional modules, a different organization of functionality among one or more functional modules is possible. For example, in other implementations, functionality of a loader and functionality of a filtering pipe may be combined into a single functional module, or distributed among more than two functional modules. In other words, where a line between the module functionality is drawn is less important than the functional features being performed.

For example, as noted above, in response to a content page request a static content endpoint server may provide a page that includes an instruction to download and invoke a loader from an active content endpoint server. As the loader loads active content files specified within a template corresponding to a content page, the loader may—for each active content method call—instead invoke a filtering pipe method which may invoke a given method after filtering parameters intended for the given method. Further, the filtering pipe, in response to being invoked from the loader, identifies—for the any suspect parameters intended for the given active content method—a corresponding filtering method appropriate to the parameters for the given active content method. In this example, information mapping an appropriate filtering method to a given method may be stored within a filtering pipe configuration file.

Continuing with this example, subsequent to the filtering pipe identifying the corresponding filtering method for the given active content method call, the filtering pipe may invoke the filtering method to filters any parameters. After the filtering pipe method filters any suspect parameters intended for the given active content method, the filtering pipe may then invoke the given active content method and pass the filtered, formerly suspect, parameters to the given active content method. In this way, the active content method, when loaded, is not invoked directly using suspect parameters. Instead, the given active content method is only reached after any suspect parameters to the given active content method pass through the filtering pipe, which includes first calling the filtering pipe to neutralize the suspect parameters. This filtering pipe is created, and repeated, for each active content file methods downloaded by the loader.

Another security advantage is that given that the initial response from a static content endpoint server provides a page received and a content security policy that instructs the client application to not execute any active content unless the source of the active content is the particular active content endpoint, then the client system itself is not allowed to be a source of executable content. Given that the client system is not a source from which to execute content, any executable content that may be provided by a malicious user would not be allowed to be executed at the client system because they were provided from the client system. In short, the content security policy restriction would prevent any download of executable content from any source except for the active content endpoint.

In another embodiment, the endpoint segregation system may have three endpoint servers, a static content endpoint server, a loader endpoint server, and an active content endpoint server. The operation and segregation of static and active content between the different endpoint servers in delivering a full-featured content page with static and active components is described below with regard to FIGS. 9-15.

FIG. 1 illustrates an example computing environment that includes an example embodiment of an endpoint segregation system with two endpoint servers, endpoint segregation system 102. In this endpoint segregation system, the two endpoints correspond to static content endpoint server 104 and active content endpoint server 106. In this example, a client application on a client system may address a static content endpoint that resolves to static content endpoint server 104 and may address an active content endpoint that resolves to active content endpoint server 106.

Endpoint segregation system 102 may be in communication with one or more client systems, depicted as client computing device(s) 104, over a network such as network 100. While an overview of the communication exchanges is provided here in introducing the endpoints and components of endpoint segregation system 102, a fuller description including integration of the content security policy features is provided below in the discussion of FIGS. 2-8.

With regard to the architecture of endpoint segregation system 102, static content endpoint server 104 may serve as a web server and may receive requests for content pages, for example, HTTP requests for web pages. In response to receiving a request for a content page, static content endpoint server 104 may access a page and ensure the page is filtered prior to providing the page to the requesting client system, as described further in FIG. 3. For example, the filtering of the page may ensure that the page provided to a requesting system only includes an instance of an active content source reference that instructs the client system to download and invokes a loader received from active content endpoint server 106, where the loader, in turn, downloads active content corresponding to the requested content page. In other words, all other instances of active content source references are filtered out or removed from the page before the page is returned in response to a content page request. Further, active content such as scripts or other executable content may be left unfiltered because prevention of execution of these scripts or executable content is accomplished through the content security policy setting.

As depicted in FIG. 1, static content endpoint server 104 may include a component configured to filter pages before the pages are provided to a requesting client system, depicted as active content filter 110. In this example, a source for the static content pages may be static content 116 within data store 150.

Further, in addition to providing the filtered page, static content endpoint server 104 may specify a content security policy for the client system to apply to the filtered page that is provided. For example, static content endpoint server 104 may set, within a message header of a response message, a specification for a content security policy that—when the content security policy is applied at the client system—prevents execution of downloaded content unless the downloaded content was downloaded from a particular source specified by the content security policy. In this example, the content security policy is set to restrict the client system to only allow downloads of executable, or active, content from an active content endpoint. Further, this single source specification in this example content security policy excludes all other sources not specified from being available for download of executable content, including the client system itself. Features of the static content endpoint server are more fully described below with regard to FIG. 3.

After a client system receives the filtered page from the static content endpoint, the client system may apply the content security policy, and parse and process the received page. In this example, at the point where the active content source reference in the received content page is reached for downloading the loader from the active content endpoint, a request is made to the active content endpoint, which then reaches active content endpoint server 106. The operations performed on the client system are more fully described below with regard to FIG. 2.

Active content endpoint server 106 may receive the request for the loader from the client system, and respond with the active content implementing the loader, and the content security policy to be applied may restrict downloads of executable content to only be from the active content endpoint. In responding to requests for content, including active and static content, active content server 106 may provide the loader on the client system with templates for identifying active content corresponding to a given content page such as templates 118, particular active content files such as active content files 120, a filtering pipe configuration file for identifying filtering methods that correspond to given methods such as filtering pipe config 122, and filtering methods for filtering parameters to given methods such as filtering methods 124. In this embodiment, templates 118 are stored within data store 152, active content files 120 are stored within data store 154, filtering pipe config 122 is stored within data store 156, and filtering methods 124 are stored within data store 158. In different embodiments, different combinations of data storage may serve to store templates 118, active content files 120, filtering pipe config 122, and filtering methods 124. The active content endpoint is more fully described below with regard to FIG. 4. In some embodiments, for each content page there may be a corresponding filtering pipe configuration file that identifies a subset of all filtering methods, where the subset of filtering methods are mapped to methods of the active content files that correspond to the content page, and where the correspondence between the active content files to the content page is based at least in part on the template for the content page.

As noted above, in response to the loader being downloaded onto the client system, the loader is invoked and begins to execute. The execution of the loader is the process that, ultimately, downloads active content for the content page from active content server 106, and generates active, interactive features of the content page. The loader is more fully described below with regard to FIG. 5.

In this way, beginning with a client system requesting a content page from a static content endpoint of the endpoint segregation system, a client may receive and render fully interactive content pages without being aware of the segregation of active and static content for the content page, and without being aware of the application of security features to different active content components to prevent cross-site scripting attacks.

Figure 2:
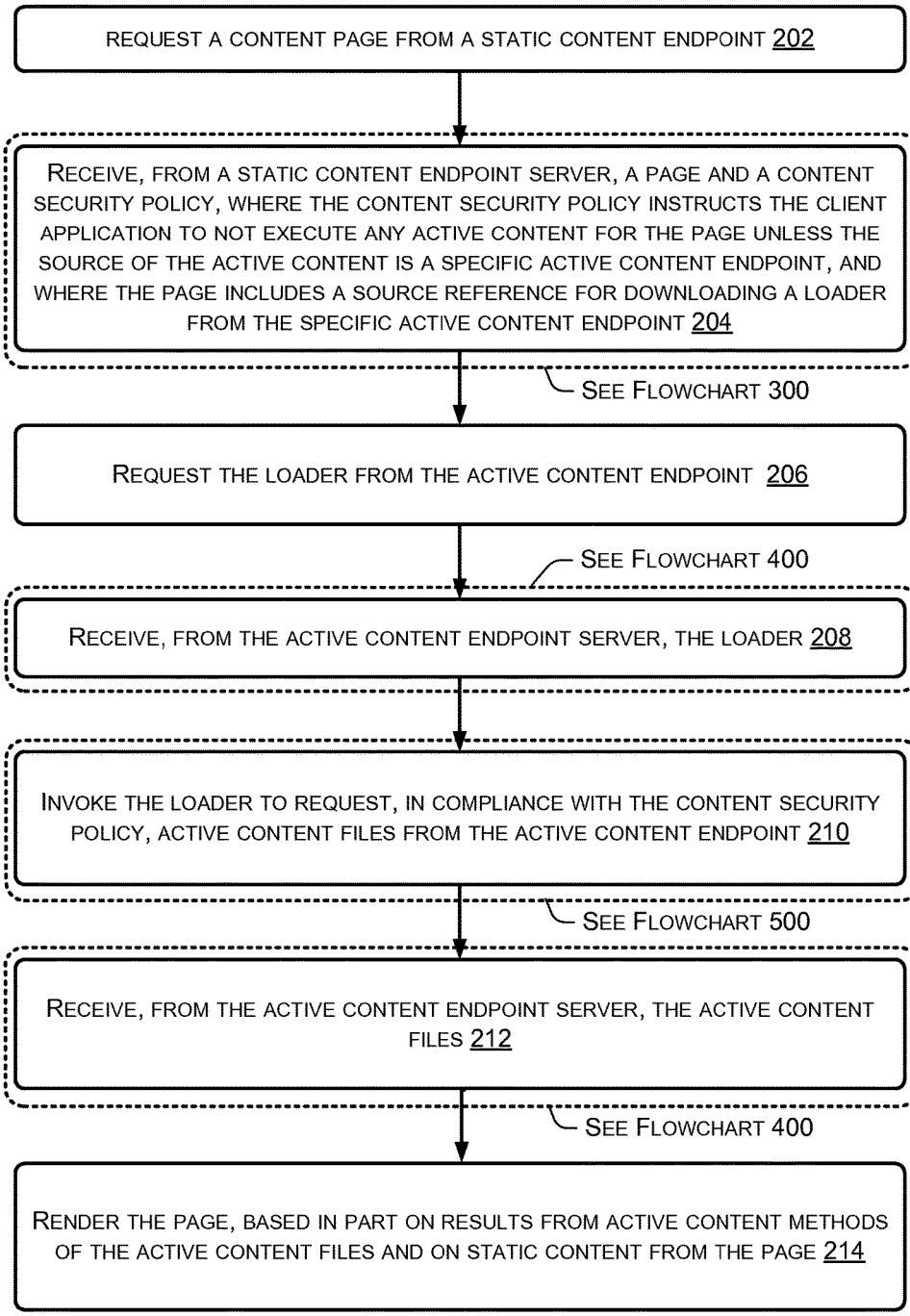
FIG. 2 is a flow diagram illustrating features of a client system interacting with an endpoint segregation system with two endpoints servers according to some embodiments.

FIG. 2 illustrates flowchart 200 depicting example operations performed on a client system, for example, within a client application as the client application interacts with the static and active endpoint servers of the endpoint segregation system. In some embodiments, the client application may be a web browser; however, in other cases, the client application may more generally be any application on the client system capable of communicating with and rendering pages from the endpoint segregation system. As discussed above with regard to FIG. 1, a user may navigate to a website provided by an online business, such as, for example, when a user enters a URL for the online business, where the URL may correspond to a static content endpoint, which may correspond to an static content endpoint server.

In this example, the client application may request a content page, where the request may be delivered to a static content endpoint server, such as static content endpoint server 104, and as depicted at 202. As noted earlier, a static content endpoint server may be a web server to provide content pages. Example features of the processing of the static content endpoint server in providing the requested content page are further described in FIG. 3 and flowchart 300.

After the client application requests the content page from the static content endpoint, the client application may receive a page in addition to receiving a content security policy to be applied to the received page, as depicted at 204. For example, the client system may send an HTTP request and receive a response that includes a page in the HTTP message body and the content security policy in the HTTP message header. In some embodiments, the content security policy may be specified within, for example, the body of the page. For example, if the page is an HTML page, the content security policy may be specified within a tag identifying the content security policy to be applied to the rest of the HTML page. Further as depicted at 204, the received content security policy, when applied by the client application, may instruct the client application to not execute any active content for the page unless the source of the active content is a specific active content endpoint, which in this example is the active content endpoint corresponding to active content endpoint server 106. Further as depicted at 204, the page from the static content endpoint server includes both static content and an active content source reverence that instructs the client application to download a loader from the active content endpoint. In this example, when the loader is downloaded from the active content endpoint server and executed in the client application, the loader may download the active content for completing the requested content page.

The client application may parse and process the page received from the static content endpoint server and begin to render static elements of the content page. At some point in the parsing, the client application may reach the active content source reference within the content page for downloading the loader, which results in requesting the loader from the active content endpoint and invoking the loader, as depicted at 206.

In response to the active content endpoint server receiving the request for the active content including the loader from a client application, the active content endpoint server responds with a message including the active content for the loader. The active content endpoint server receiving the request and producing a response is described further in FIG. 4. The client application receiving the loader from the active content endpoint server is depicted at 208.

In response to the client application receiving the loader from the active content endpoint, the client application begins executing the loader. As depicted at 210 and 212, the loader may download active content files from the active content endpoint, where the download includes invoking the loader to request active content files from the active content endpoint and receive the active content files from the active content endpoint server. However, in some examples, to identify the active content files be loaded for the particular content page, the loader may first download a template that corresponds to the content page, where the template may specify active content files to be loaded for the content page.

These active content files may include one or more methods. The template may further specify any parameters, such as static elements within the content page or user inputs, that are expected by the methods. In some examples, the loader may identify the template to request from the active content endpoint by providing an identifier that uniquely identifies the content page. For example, the loader may send a request to the active content endpoint for the template, where the request specifies a content page identifier. In this way, the active content endpoint server, in response to receiving the request for the template and based at least in part on the identifier for the content page, may identify the template to provide the loader. In some cases, the identifier for the content page may be included in the static content of the page supplied from the static content endpoint to the client application.

Further, given that the loader was received from the active content endpoint with a content security policy instructing the client application to not execute any active content unless the source of the active content is the specific active content endpoint, the request from the loader to the active content endpoint for the template is in compliance with the content security policy.

Continuing with this example, based at least in part on the template received from the active content endpoint, the loader may determine an active content file to download. In some cases, the loader may identify all active content files and request all active content files from the active content endpoint at a same time. In this example, for simplicity, there may be two active content files, respectively including two active content methods, and the loader may request both active content files in a single request to the active content endpoint; this active content request to the active content endpoint is also depicted at 210 and 212. Further, FIG. 5 describes features on the active content endpoint server in responding to requests.

Continuing this example, as also depicted at 210 and 212, the loader executing on the client application may also download the filtering pipe method from the active content endpoint. After receiving an active content file that includes the filtering pipe from the active content endpoint, the loader may determine, for each of the active content methods in the downloaded active content files, any suspect parameters to be passed to the active content methods.

For example, given the two active content methods mentioned above, for the first active content method, the loader may invoke the filtering pipe with any suspect parameters for the first active content method in addition to passing to the filtering pipe an identifier to identify the first active content method. The filtering pipe, in response to being invoked from the loader, may request a config file from the active content endpoint, where the config file maps, or otherwise corresponds, methods with filtering methods tailored specifically to clean the type of parameters expected by the methods. Tailoring of filtering methods to expected parameter types may result in higher likelihoods of neutralizing or eliminating any attacks. However, if a given method is not mapped to a specific filtering method, or if the filtering method is otherwise unavailable, the filtering pipe may instead pass the suspect parameters to a generic filtering method, and then invoke the method with the results of the generic filtering method. In some cases, a given type of filtering method may be mapped to, and called from the filtering pipe, for multiple, different methods. For example, if different methods, performing different functions, accept a similar or a same type of parameter, then a single filtering method may be mapped to and used for both methods. In other cases, for multiple parameters, multiple different filtering methods may be called to filter respective parameters.

In different embodiments, the filtering methods may apply different approaches for removing threats from suspect parameters. For example, a filtering method may apply different types of whitelist filters to render any suspect data or parameters safe. As one example, if an input field is intended to receive an email address, then a filtering method for such an input field may remove any characters that are not valid email address characters or symbols. In other cases, the filtering methods may apply a context sensitive encoding to render a suspect parameter safe for a given method. For example, a filtering method may identify one or more portions of the suspect set of parameters interpretable by the client application as active content and encode the identified one or more portions to not be interpretable by the client application as active content.

To continue this example, the filtering pipe, after receiving the config file from the active content server, may identify a first filtering method to call for any parameters for the first active content method. The filtering pipe may then invoke the first filtering method with any parameters for the first active content method, and receive a clean set of parameters from the first filtering method when the first filtering method is complete. At this point, the filtering pipe may invoke the first active content method with the cleaned set of parameters.

In this way, what began with the loader loading a template for the content page to identify an active content file and the first active content method, and with the loader using the filtering pipe to clean any parameters to the first active content method, at this point results in execution of the first active content method, and consequently, the generation of active content in, for example, a client application window.

A similar process is performed after the execution of the first active content method and control is passed to the loader. Specifically, the loader proceeds to call the filtering pipe again with an identifier for the second active content method and any parameters for the second active content method. In other examples, if there were additional active content files that were downloaded from the active content server, where the template indicated additional methods to call, the loader would continue this cleaning process until all active content methods in the active content files were invoked.

To complete this example, and as depicted at 214, the client application may have rendered the static content from the content page that was received from the static content endpoint, and through repeated loader invocations of the filtering pipe, and ultimately of the active content methods specified in the template for the content page—where the loader, filtering pipe, filtering methods, and active content files are downloaded from the active content endpoint—both the static and active elements of the content page may be generated and rendered in a client application window. Thereby producing an interactive, and safe, content browsing experience for a user.

Figure 3:
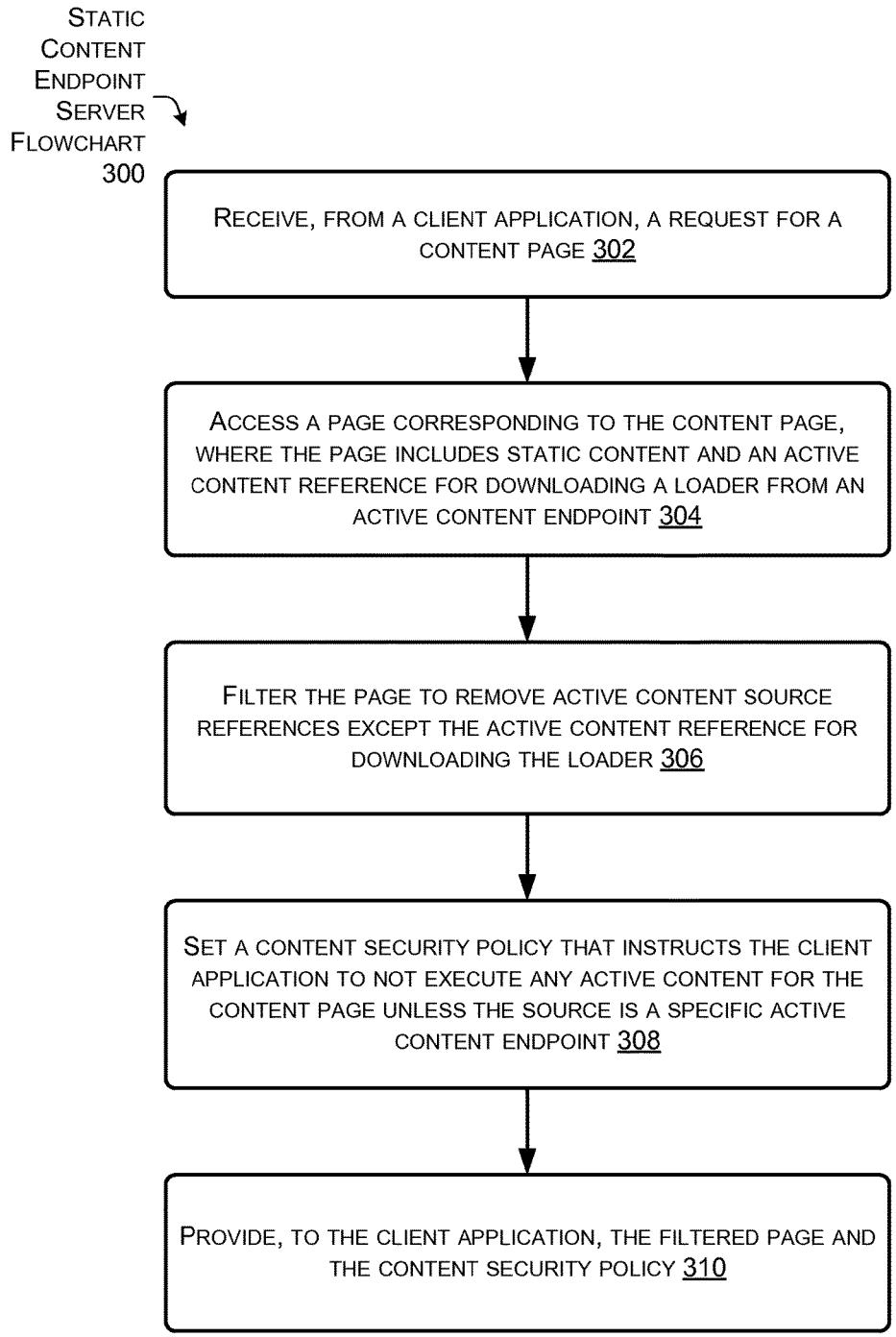
FIG. 3 is a flow diagram illustrating features of a static content endpoint server within an endpoint segregation system with two endpoint servers according to some implementations.

FIG. 3 illustrates flowchart 300 depicting example operations performed on a static content endpoint server of the endpoint segregation system with two endpoints. As discussed above with regard to FIG. 2, a user may navigate to a website provided by an online business, such as, for example, when a user enters a URL for the online business.

In this example, a client application may request a content page, and as depicted at 302, the static content endpoint server may receive this request for the content page from the client application, which in this case is executing on the client system.

In response to receiving the request for the content page, the static content endpoint server may access a page corresponding to the content page, as depicted at 304. In this example, the page may include static content and an active content reference such that when the active content reference is parsed on the client application, a download of a loader from the active content endpoint is invoked, where the loader, when downloaded and executed downloads active content from the active content endpoint server.

In some cases, the static content may have been stripped of all active content source references prior to storage, in which case, the static content endpoint server may inject the active content reference for the loader. In other cases, the active content reference may already be present within a given page. Further, in this case, if the page is already stripped of all active content source references, it would be unnecessary for the static content endpoint server to filter the page as depicted at 306. However, in other cases, the page may not have been previously filtered and may include active content, and in this case, the static content endpoint server may filter the content page, as depicted at 306. This filtering may remove all active content source references and leave or insert an active content reference for downloading the loader from the active content endpoint.

In this example, given a page without any active content, the static content server may set a content security policy that may be applied by the client application to the page provided. As depicted at 308, the content security policy may instruct the client application to not execute any active content for the content page unless the source is a specific or particular active content endpoint, for example, the active content endpoint corresponding to active content endpoint server 106. In this example, such a definition of the content security policy may prevent the client application itself from being a source of active content to execute.

At this point, to complete this example, the static content endpoint server may provide to the client application at the client system the filtered page corresponding to the content page and also provide the determined content security policy, as depicted at 310. At this point, the client application has access to static content within the received page, and may process the page as described earlier with regard to FIG. 2.

Figure 4:
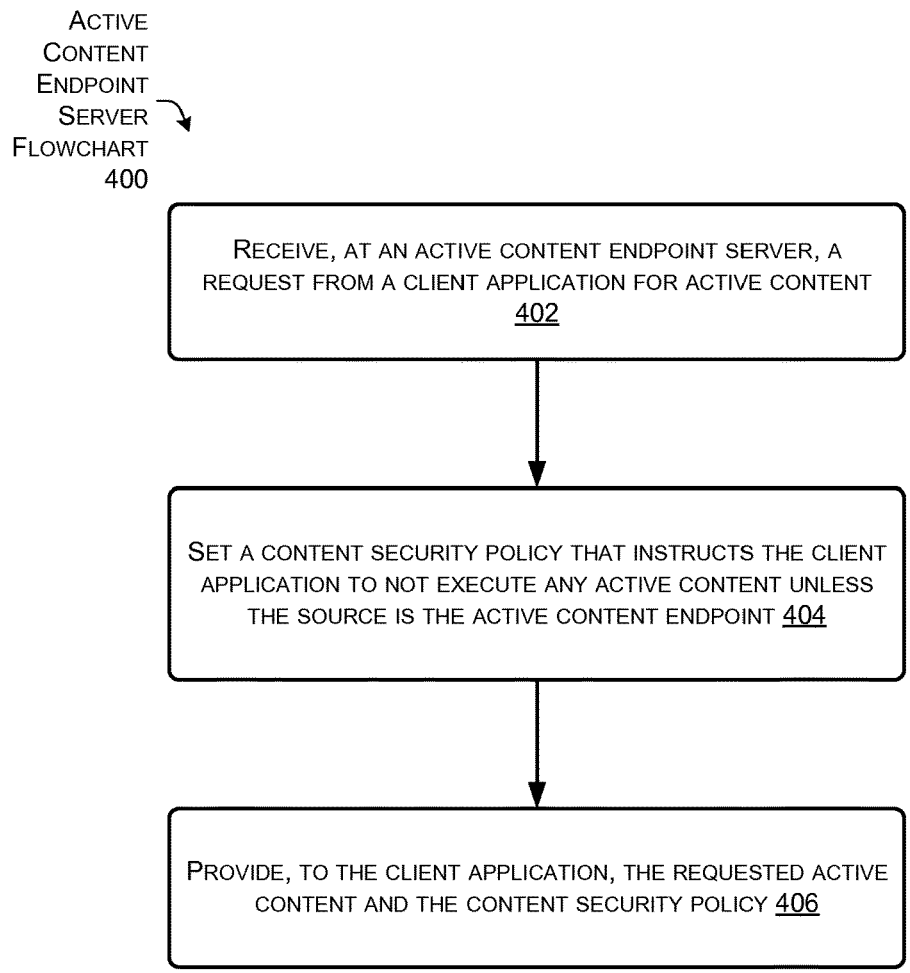
FIG. 4 is a flow diagram illustrating features of an active content endpoint server within an endpoint segregation system with two endpoint servers according to some implementations.

FIG. 4 illustrates flowchart 400 depicting example operations performed on an active content endpoint server of the endpoint segregation system with two endpoints. As discussed above with regard to FIG. 2, a user may navigate to a website provided by an online business, such as, for example, when a user enters a URL for the online business.

In this example, and as illustrated in FIG. 1, an active content endpoint server may store active content for implementing a loader and a filtering pipe, in addition to the content requested from the loader and filtering pipe during their respective execution and as the loader and filtering pipe load and channel active content methods through a filtering pipe before being invoked to generate active content for a content page.

In this implementation, the features described in flowchart 400 are similar in responding to requests for any content from the client system. In other words, whether the request from the client system is for active content implementing the loader, the filtering pipe, the filtering methods, filtering pipe config files, or any other active or static content accessible from the active content endpoint, the active content endpoint server processes the request similarly.

As one example, the active content endpoint server may receive a request from a client application for active content implementing the loader, as depicted at 402. In response, the active content endpoint server may provide a content security policy to be applied by the client application, and where the content security policy is set in a response message, as depicted at 404. In this example, the active content endpoint server may set the content security policy to instruct the client application to not execute any active content unless the source of the active content is the active content endpoint, to the exclusion of all other sources.

After the active content endpoint server has accessed the content requested, which may be active or static content, the active content endpoint server may send both the content security policy and the active or static content to the requesting system, in this example, the client application executing on the client system, as depicted at 406.

Figure 5:
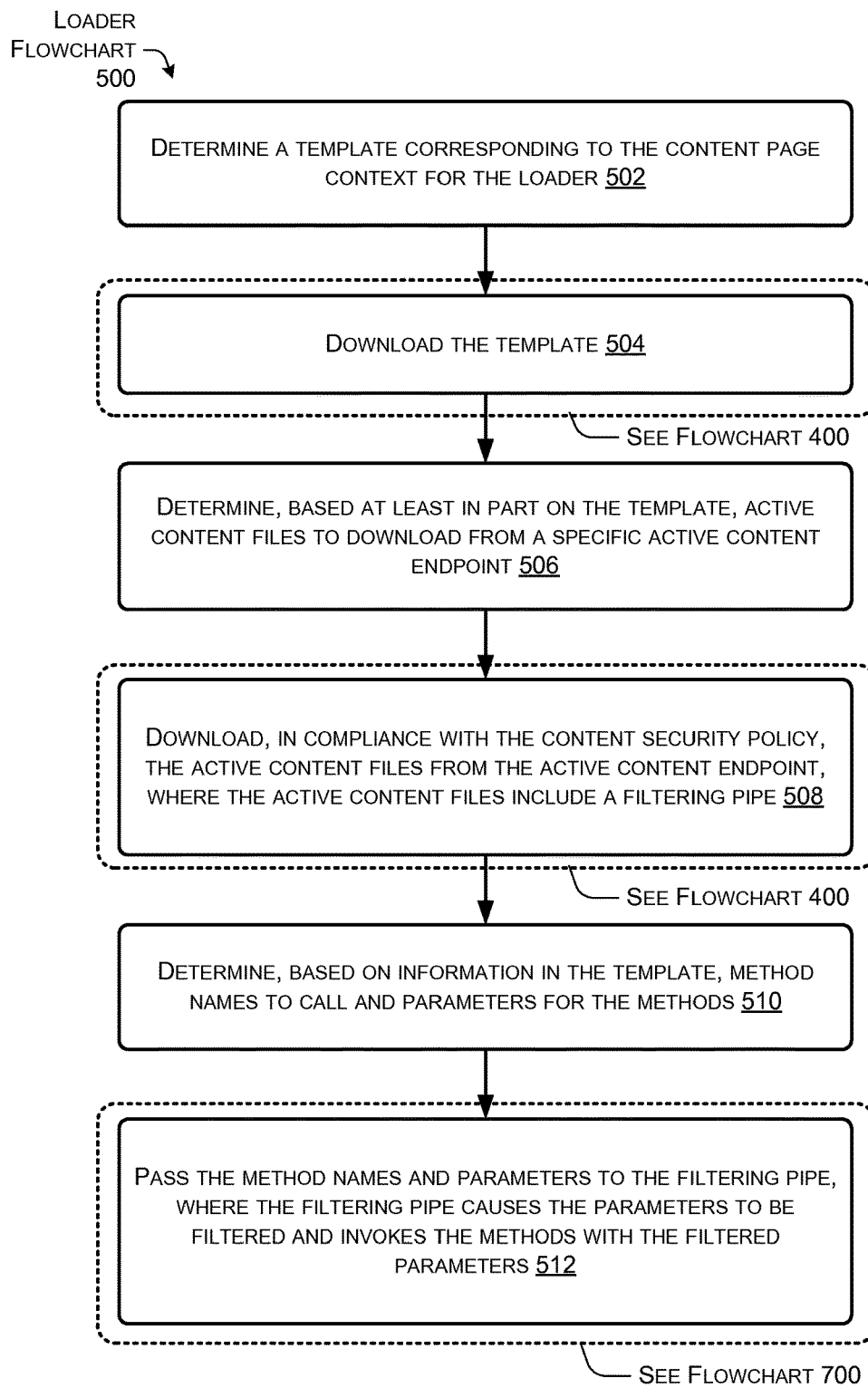
FIG. 5 is a flow diagram illustrating features of loader operating on a client system and interacting with an endpoint segregation system with two endpoint servers according to some implementations.

FIG. 5 illustrates flowchart 500 depicting example operations performed on a client application executing a loader in an endpoint segregation system with two endpoints, for example, as described earlier with regard to FIG. 2. Further as discussed above with regard to FIG. 2, a user may navigate to a website provided by an online business, such as, for example, when a user enters a URL for the online business.

In this example, and as illustrated in FIG. 1, a static content endpoint server may store pages to serve to client applications, where the pages include static content and an active content source reference for downloading the loader. Flowchart 500 begins at the point that the client application, in parsing the page received in response to a request from the static content endpoint for a content page, invokes the loader received from the active content endpoint server, and the downloaded loader begins to execute. In this example, the requested content page provides the context for the loader.

In this example, the loader, to determine which active content files to download, may request, from the active content endpoint, a template corresponding to the content page context for the loader, where the template indicates which active content files to download for the requested content page. As depicted at 502, the loader may use a content page identifier for the content page to determine a corresponding template.

This template may be downloaded, as depicted at 504. In this example, the template is downloaded from the active content endpoint through a request for the template from the loader to the active content endpoint. However, in cases where the template does not include active content, the template may be requested from a location other than at the active content endpoint because the content security policy would not apply to static content. The loader, after a response from the active content endpoint server, may receive the template for the content page in addition to receiving a corresponding content security policy to be applied by the client application.

The template may further specify one or more active content files that include the active content methods, where the active content files are accessible from the active content endpoint server. The loader, based at least on the template for the content page, may determine one or more active content files to download from a specific active content endpoint, in this case the active content endpoint corresponding to active content endpoint server 106, as depicted at 506. The loader may then download these active content files, for example, though a message request to the active content endpoint, as depicted at 508.

Further as depicted at 508, the active content files downloaded from the active content endpoint server may include an implementation of a filtering pipe method. However, in other cases, the loader may download the filtering pipe method separately. Since the active content endpoint is an allowable source according to the content security policy, execution of these active content files and methods is allowed by the client application.

At this point, the loader, based on information within the template, may determine method names for the methods to be called for the content page, including corresponding parameters for the methods, as depicted at 510. For example, and based on information within the template for the content page, the loader may pass a method identifier for a method call along with any parameters for the method. In some cases, the method identifier may be the name of the method. In this example, the method names and any parameters to the methods are passed to the filtering pipe, as depicted at 512. For a given method and corresponding call to the filtering pipe, control may pass from the loader to the filtering pipe, where the filtering pipe proceeds to call a filtering method to clean the parameters to the method call before the filtering pipe invokes the method call with the cleaned parameters, as also depicted at 512.

In this example, execution may then pass from the given method, which was invoked from the filtering pipe, back to the loader. The loader may then, for each remaining method call, based on information from the template, repeat the process of channeling any parameters to the remaining method calls to the filtering pipe before the filtering pipe invokes the remaining method calls with cleaned parameters. In this way, active content for the content page may be rendered.

Figure 6:
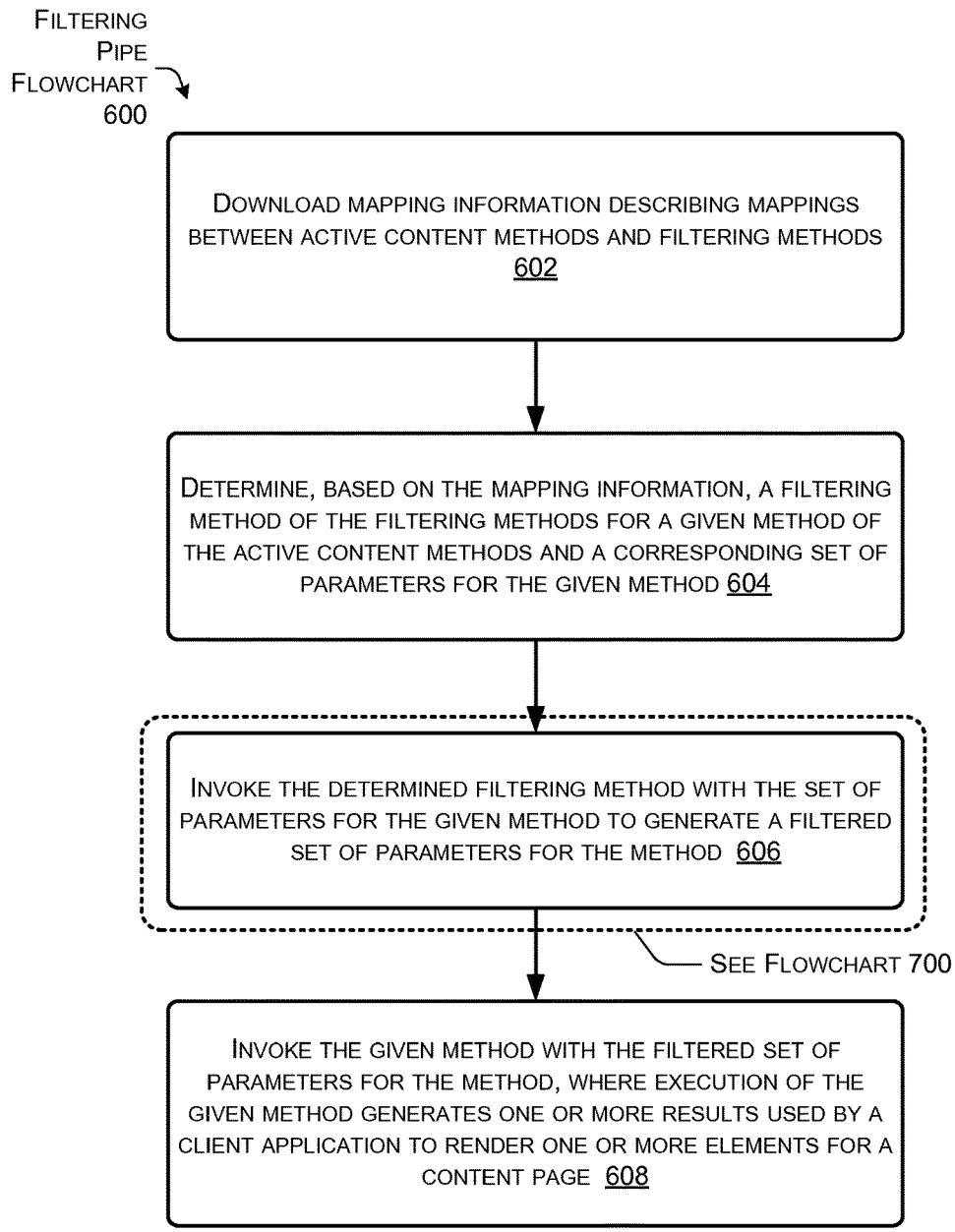
FIG. 6 is a flow diagram illustrating features of a filtering pipe operating on a client system and interacting with an endpoint segregation system with two endpoint servers according to some implementations.

FIG. 6 illustrates flowchart 600 depicting example operations performed on a client application executing a filtering pipe invoked from a loader, for example, as described earlier with regard to FIGS. 5 and 2. Further as discussed above with regard to FIG. 5, the loader may, for each method downloaded from an active content endpoint, call the filtering pipe.

In this example, the filtering pipe may be called with parameters indicating a method call identifier and a set of parameters for the method. In response to being called, the filtering pipe, as depicted at 602, may download mapping information describing mappings or correlations between methods and filtering methods. In this example, the mapping information may be downloaded from the active content endpoint. However, in other cases, the mapping information may come from any other source, and since the mapping information may be static content, the mapping information would not be subject to a content security policy. In subsequent invocation of the filtering pipe, a check may be done to determine if the mapping information has been downloaded to avoid repeated downloads. Further, given that the content security policy has been set to instruct the client application to only allow active content from the active content endpoint to be executed, this download of mapping information is permitted by the client application enforcing the content security policy settings.

In other embodiments, the mapping information may be downloaded at different points or in different ways. For example, there may be a single mapping information file that may be downloaded by the loader prior to calling the filtering pipe, where the filtering pipe has access to all the mapping information. In such a case, 602 would not be necessary within flowchart 600. Further, similar to the template information that is specific to a content page, there may be mapping templates specific to a content page, where the mapping template has mapping information for the particular set of methods calls to be made for the content page. In other cases, the filtering pipe may download, for each invocation, single method mapping information.

Based at least on the mapping information, the filtering pipe may determine a filtering method for a method identified using the method identifier received, where the corresponding set of parameters for the given method were also received as parameters to the filtering pipe call, as depicted at 604. At this point, the filtering pipe may invoke the filtering method for the identified method and provide the filtering method with the set of parameters for the identified method. In response, the filtering pipe may receive from the filtering method a cleaned or filtered set of parameters, as depicted at 606. Example filters for filtering method are further described with regard to FIG. 7.

Given a filtered set of parameters, the filtering pipe may invoke the identified method with the filtered set of parameters, and where execution of the identified method may generate one or more results that may serve to render active content for the content page within the client application, as depicted at 608.

Figure 7:
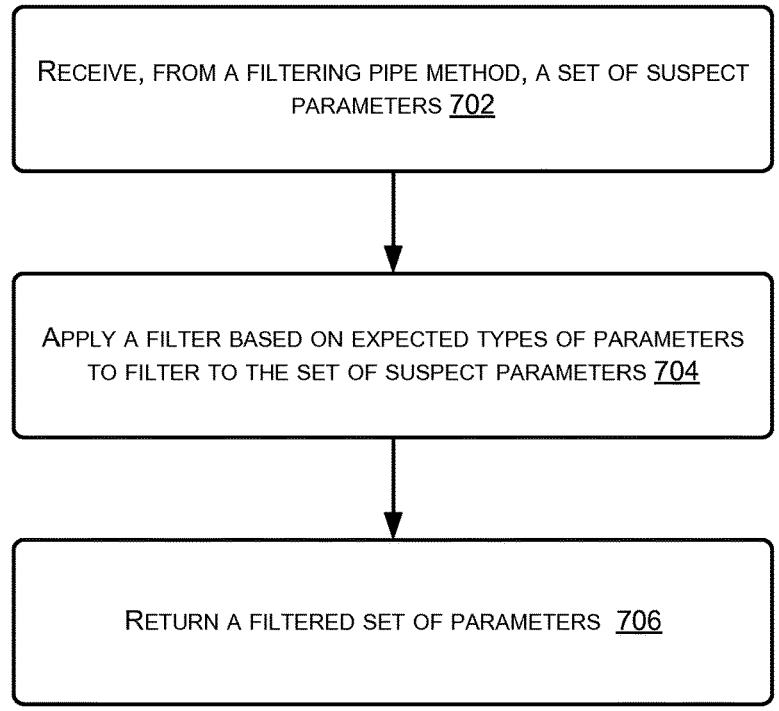
FIG. 7 is a flow diagram illustrating features of a filtering method operating on a client system with two endpoint servers according to some implementations.

FIG. 7 illustrates flowchart 700 illustrating example operations of a filtering method—where the filtering method, as discussed above with regard with FIG. 6, may be invoked from a filtering pipe, which, as discussed above with regard to FIG. 5, may be invoked from a loader, which, as discussed above with regard to FIG. 2, may be invoked in response to a client system downloading a page from a static content endpoint, where the page includes an active content source reference instructing a client application to download the loader from the active content endpoint.

As discussed earlier, a filtering method may be invoked from a filtering pipe so that the filtering method may filter, clean, or otherwise neutralize to remove any threat, parameters intended for a particular method. Because different methods may expect different types of parameters, it may be difficult or impossible, to expect a single type of filtering approach to remove the threat from all types of parameters.

As a solution to this problem, the endpoint segregation system may store, for a given type of parameter or for a given method expecting that type of parameter, a filtering method that is tailored to work on the given type of parameter. In this way, because the type of parameter expected is known, the scope and scale of the filtering problem is reduced because a filtering method may now know are what types of content within the method parameters should and should not be present.

Further serving to reduce the scope of the problem is that tailored filtering methods are not necessary for all methods in an application flow. Instead, tailored filtering methods may be developed for exposed methods that receive input from users and not for methods that do not receive input from users. Another way in which the scope of the filtering problem is reduced in the endpoint segregation system is that because a given filtering method is developed to apply filters to a particular type of input parameter, the type of parameter is a known quantity, therefore there is no need to perform a semantic analysis to determine the type of parameter. Therefore, the filtering methods may simply apply filters based on a syntactic analysis because the semantic analysis is built in to the tailoring of the filtering methods. In other words, the division and specialization of the filtering methods is based on semantic principles.

For example, for a method that expects text input, the filtering method for this type of parameter may focus on ensuring that the suspect set of parameters includes nothing more than alphanumeric data.

In some embodiments, a generic filtering method may be developed and be available to the filtering pipe in the case that the filtering pipe encounters a method for which there is no mapped filtering method. In such a case, the generic filtering method may apply both semantic and syntactic analysis in determining a filter to apply to a suspect set of parameters.

As depicted at 702, the filtering method may be invoked and may receive a set of suspect parameters. Given the set of suspect parameters, and the type of parameters expected, the filtering method may apply one or more types of filters, as depicted at 704. For example, the filtering method may apply a whitelist filter exclusively, or the filtering method may apply both a whitelist filter and an encoding filter, among others. In other cases, different types of filters based on expected parameters may be used.

After the received set of parameters has been filtered, the filtering method may return a filtered set of parameters, in this example, the filtered set of parameters are returned to the filtering pipe, as depicted at 706.

Figure 8:
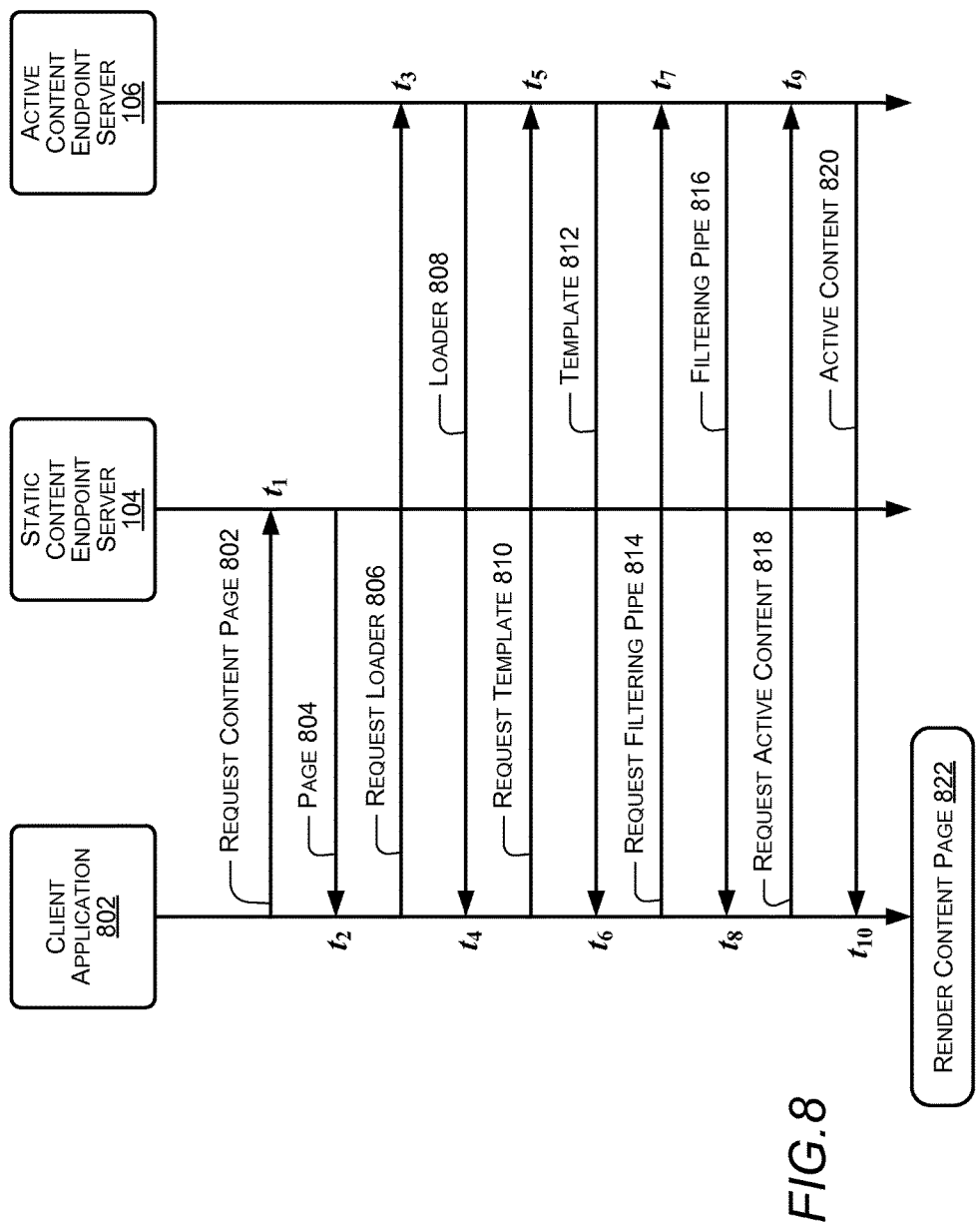
FIG. 8 illustrates an overview of communication activity between a client system, a static content endpoint server, and an active content endpoint server within an endpoint segregation system with two endpoint servers according to some implementations.

FIG. 8 illustrates an overview of sample communications between a client application 802 and endpoints of an endpoint segregation system with two endpoints, a static content endpoint server 104 and an active content endpoint server 106. In different cases, more or fewer messages may be exchanged, including different types of messages. These message exchanges are not intended to be limiting, and instead are an example overview of communication traffic that has been discussed above in greater detail with regard to FIGS. 2-7.

As discussed with regard to FIG. 2, a user navigating to a website using a client application may request a content page from a static content endpoint of an endpoint segregation system, as depicted by request for content page 802. In this example, the request may be an HTTP message that is received at static content endpoint server 104 at time $t_1$.

In response to receiving the request for the content page, depicted as message 802 received at time $t_1$, static content endpoint server 104 may access a page corresponding to the content page and send the page to the client application 802. Further, the message to the client application with the content page may also specify a content security policy that, when applied at the client application, instructs the client application to not execute any active content for the content page unless the source of the active content is the active content endpoint. As discussed above, pages corresponding to content pages, including the requested content page, may be stored such that all active content has been removed. In other cases, as a precaution, static content endpoint server 804 may run a filter over the page prior to sending the page to the requestor, where the filter analyzes the content of the page to identify and remove any active content references, such as JavaScript source includes, except an active content reference for the loader at the active content endpoint.

In response to receiving the page, depicted as message 804 received at time $t_2$, the client application may apply the content security policy provided with the message delivering the page. As discussed above, in some cases, the content security policy may be set within an HTTP message header. The client application may then begin to render static elements of the page and also begin downloading the loader from the active content endpoint, where the download process generates a request for the loader 806 sent to the active content endpoint.

In response to active content endpoint server 106 receiving the request for the loader from the client application, depicted as message 806 received at time $t_3$, active content endpoint server 106 may respond with a message that includes the loader and a content security policy. For example, the loader may be delivered to the client application in an HTTP message body, and the content security policy may be set in the HTTP message header.

In response to client application 802 receiving the loader from active content endpoint server 106, depicted as message 808 received at time $t_4$, client application 802 may invoke the loader. The loader, once it begins to execute on the client application, may request a template from the active content endpoint. As discussed above, the template may be mapped to the particular content page requested from the client system, and the request message from the loader to the active content endpoint may include an indication of an identifier for the particular content page or an identifier for the template corresponding to the particular content page.

In response to active content endpoint server 106 receiving the request for the template from the loader on the client application, depicted as message 810 received at time $t_5$, active content endpoint server 106 may send the template and a content security policy. For example, the request may include a content page identifier and active content endpoint 106 may use the content page identifier to determine a corresponding template. In some cases, active content endpoint 106 may store or have access to mapping information that maps content page identifiers to corresponding templates.

In response to the loader on client application 802 receiving the template, depicted as message 812 received at time t6, client application 802 may apply the content security policy. At this point, the loader may use the template to determine which active content files may be needed for the content page. However, in this example, the loader does not invoke the method calls directly. Instead, the loader invokes a filtering pipe method to cause parameters to the method calls in the active content files to be filtered prior to the filtering pipe invoking the method calls. As such, at this point, the loader may request the active content implementing the filtering pipe and also request the active content files. In different implementations, this may be done with a single request message, or as depicted in FIG. 8, with two request messages.

In response to the active content endpoint server 106 receiving a request for the filtering pipe, depicted as message 814 received at time t7, the active content endpoint server may access and send the filtering pipe to the loader on the client application. Further, as with previous messages from the active content endpoint server that include active content, active content endpoint server 106 may set, within the message including the filtering pipe, a content security policy to instruct the client application to not execute any active content for the content page unless the source for the active content is the active content endpoint.

In response to the loader on client application 802 receiving the filtering pipe from active content endpoint server 106, depicted as message 816 received at time t8, the client application may apply the content security policy included within the message delivering the filtering pipe. At this point, the loader may proceed to request the active content files determined based on the previously received template.

In response to active content endpoint server 106 receiving a request for the active content files, depicted as message 818 received at time t9, active content endpoint server 106 may access and send the active content files. Further, active content endpoint server 106 may set, within the message including the active content files, a content security policy to instruct the client application to not execute any active content unless the active content was sourced from the active content endpoint.

In response to the loader on client application 802 receiving the active content files from active content endpoint server 106, depicted as message 820 received at time t10, the client application may apply the content security policy included within the message delivering the active content files. At this point, the loader may proceed to invoke the filtering pipe to filter parameters for the one or more methods calls within the active content files, where the filtering pipe, after filtering the parameters, invokes the one or more method calls with the filtered parameters.

In this way, static and active content is used to render a fully interactive content page on the client system application for an engaging, and safe, user experience, as depicted at 822.

Figure 9:
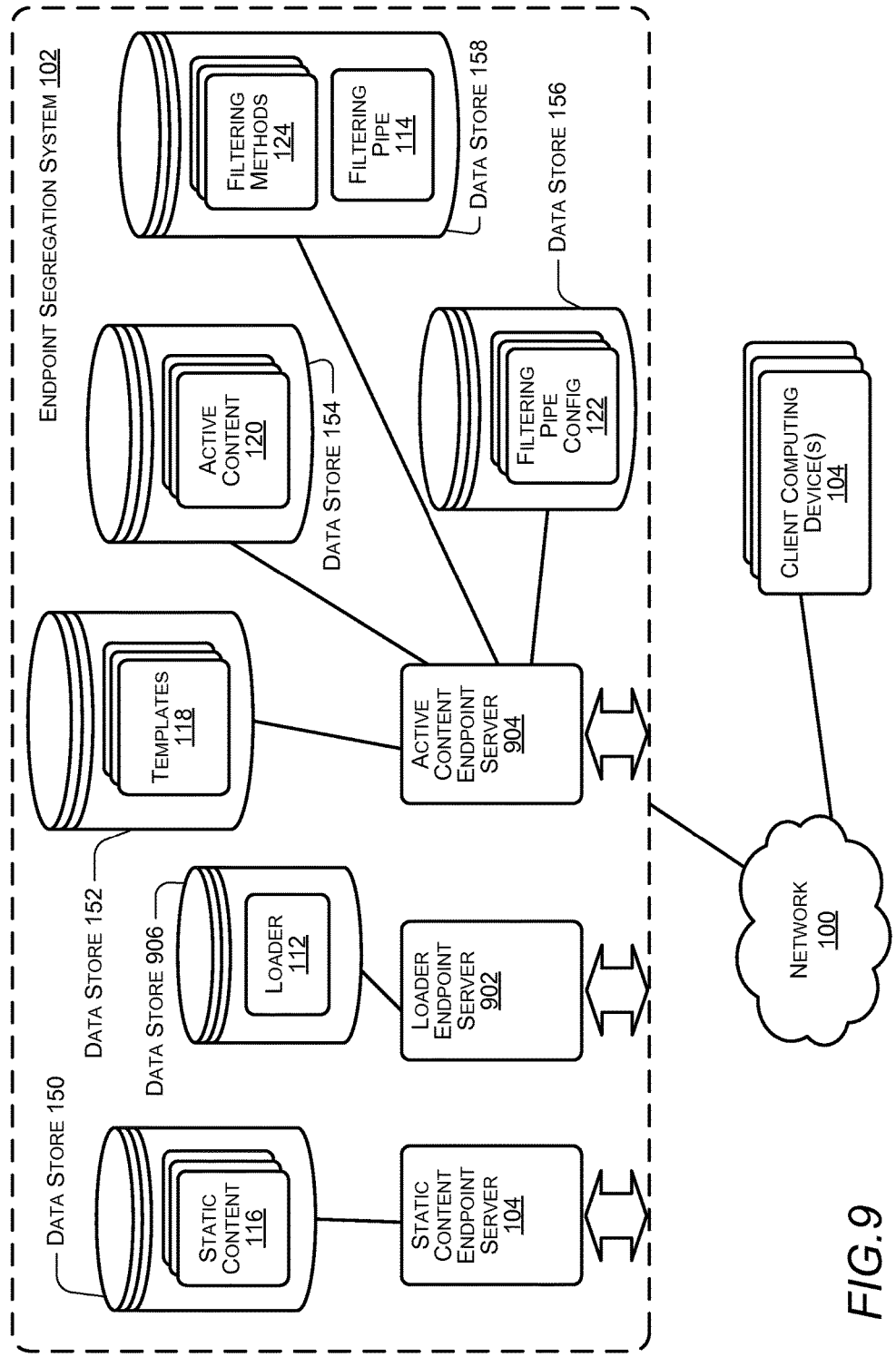
FIG. 9 is a second illustrative architecture depicting an example endpoint segregation system with three endpoint servers according to some implementations.

FIG. 9 illustrates an example computing environment that includes an example embodiment of an endpoint segregation system with three endpoints, endpoint segregation system 102. In this embodiment, the three endpoints correspond to static content endpoint server 104, loader endpoint server 902, and active content endpoint server 904. In this example, a client application on a client system may address a static content endpoint that resolves to static content endpoint server 104, may address the loader endpoint that resolves to loader endpoint 902, and may address an active content endpoint that resolves to active content endpoint server 904.

Generally, the principles of the segregation of static and active content are similar to those discussed above with regard to FIGS. 1-8. However, in this three endpoint embodiment, the static content endpoint server, in response to a request for a content page, provides a page to a client application with a content security policy set only to the loader endpoint—excluding the static content endpoint, the client application, the active content endpoint, and any source that is not the loader endpoint.

Further in this three endpoint embodiment, the loader endpoint provides the loader to the client application with a content security policy set to only the loader endpoint and the active content endpoint. As depicted, data store 906 may be accessible to the loader endpoint server and may store the active content for the loader. In this way, the content security policy from the loader endpoint may instruct the client application to not execute any content unless the source of the content is the loader endpoint or the active content endpoint. This content security policy allows the loader to execute to download templates, a filtering pipe, a filtering pipe config file with mapping information between given methods and corresponding clean up or filtering methods, and any active content files.

One of the advantages of using three endpoints instead of two endpoints is that the static content endpoint is relieved of filtering out active content from content pages prior to sending a page to a requesting client system. For example, because the loader endpoint does not have access to any active content files, and because the static content endpoint server sets the content security policy to only the loader endpoint—then even if active content were included in the pages served to a client application, any attempts from the active content in the page to download and invoke active content on the loader endpoint would be ineffective because the loader endpoint server only has active content for the loader to provide.

In other words, calls to active content methods only occur as a result from execution of the loader, which is the only allowable source of executable content as specified according to the content security policy from the static content endpoint. Further, because the loader uses the filtering pipe to invoke any methods, a result is that any method invocations are only possibly through the filtering pipe.

In some embodiments, the loader endpoint server may have access to other files than those depicted in FIG. 9. For example, the loader endpoint may have access to templates, or the filtering pipe, or the filtering pipe config information. In such a case, the content security policy from the static content endpoint when delivering the content page that includes active content to download the loader would still only allow download from the loader endpoint. Such a content security policy restriction in this example would prevent any direct access to active content files that may be attempted from any active content because any active content in the delivered content page would only be able to access the loader endpoint, which does not have access to active content files. In this example, the content security policy set by the loader endpoint when delivering content would include both the loader endpoint and the active content endpoint.

Another advantage of the three endpoint embodiment of the endpoint segregation system is that, in contrast to the two endpoint embodiment of the endpoint segregation system, the static content endpoint server 104 need not implement an active content filter. In other words, because the content security policy set from the static content endpoint server only enables downloads of active content from the loader endpoint, whether or not a page delivered from the static content endpoint server includes or does not include source reference inclusions of active content is irrelevant.

Figure 10:
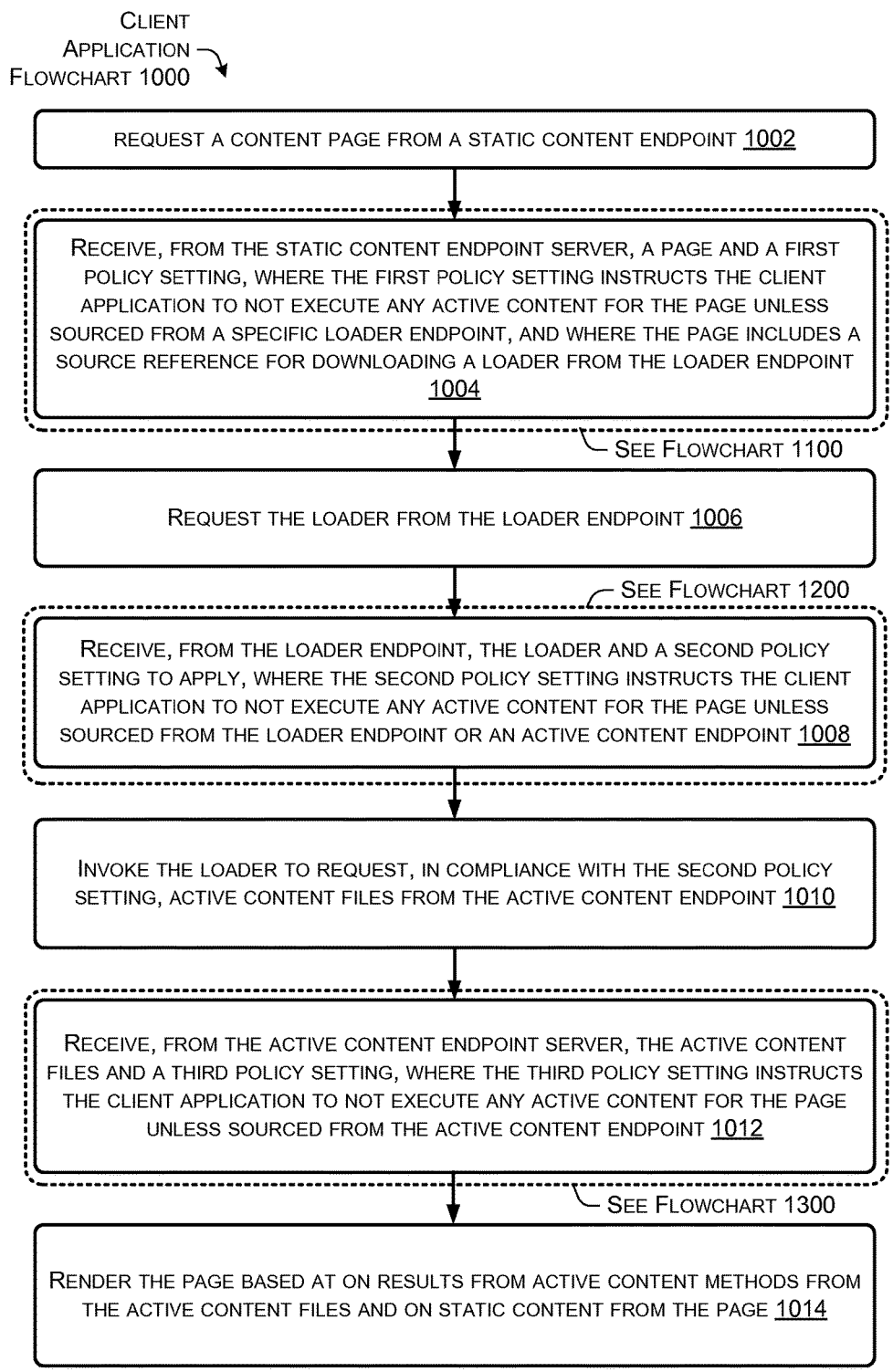
FIG. 10 is a flow diagram illustrating features of a client system interacting with an endpoint segregation system with three endpoint servers according to some embodiments.

FIG. 10 illustrates flowchart 1000 depicting example operations performed on a client application, for example, within a client application sends messages to and receives messages from a static content endpoint, a loader endpoint, and an active content endpoint of an endpoint segregation system with three endpoints. In this example, a user may navigate to a website for an online business, or any other online presence, by entering a URL or following a link.

In this example, the client application may request a content page from a static content endpoint, where the request may be delivered to a static content endpoint server, such as static content endpoint server 104, as depicted in 1002. Static content endpoint server 104 may include a web server to provide pages. Example features of the processing of the static content endpoint server in providing the requested content page are described with regard to FIG. 11 and flowchart 1100.

After the client application requests the content page from the static content endpoint, the client application may receive a page corresponding to the content page from the static content endpoint server, and may also receive a first policy setting to be applied by the client application, as depicted at 1004. In this example, the page provided by the static content endpoint may include static content that corresponds to the requested content page. In some implementations, similar to the endpoint segregation system with two endpoints, the static content endpoint server in the three endpoint implementation may filter the page prior to providing the page in response to a content page request, where filtering the page may include removing all instances of active content source references. However, in other cases, no filtering may be done to the page prior to providing the page to the client application in response to a content page request.

In some embodiments, the client application may send an HTTP request and receive a response that includes the page in an HTTP message body and the policy setting in the HTTP message header. In other embodiments, the policy setting may be specified within, for example, the body of the page. Further as depicted at 1004, the received policy setting, when applied by the client application, may instruct the client application to restrict execution of downloaded content to occur only if the content was download from a specified source according to the policy setting, which in this example is the loader endpoint. Further as depicted at 1004, the page from the static content endpoint includes an active content source reference instructing the client application to download the loader from the loader endpoint and execute the loader on the client application, where the loader may download active content from the active content endpoint for generating active content features for the content page.

The client application may parse and process the page received from the static content endpoint and begin to render static elements of the page. At some point in the parsing, the client application may reach the active content source reference within the page for downloading the loader from the loader endpoint, and in response, the client application may request the loader from the loader endpoint, as depicted at 1006.

In response to the loader endpoint server receiving the request for the active content including the loader from the client application, the loader endpoint server responds with a message including the active content for the loader. The loader endpoint server receiving a request and producing a response is described further with regard to FIG. 12. The client application receiving the loader from the loader endpoint and receiving the second policy setting is depicted at 1008. In this example, the second policy setting instructs the client application to not execute any content unless sources from the loader endpoint or the active content endpoint.

In response to the client application receiving the loader from the loader endpoint, the client application begins executing the loader. As depicted at 1010 and 1012, the loader may download active content files from the active content endpoint, where the download includes invoking the loader to request active content files from the active content endpoint and receive the active content files from the active content endpoint server. However, in some examples, to identify the active content files be loaded for the particular content page, the loader may first download a template that corresponds to the content page, where the template may specify active content files to be loaded for the content page. Further, FIG. 13 describes features on the active content endpoint in responding to requests.

These active content files may include one or more methods. The template may further specify any parameters, such as static elements within the content page or user inputs, that are expected by the methods. In some examples, the loader may identify the template to request by providing, in a request to the active content endpoint, an identifier that uniquely identifies the content page. For example, the loader may send a request to the active content endpoint for the template that specifies an identifier corresponding to a content page. In this way, the active content endpoint server, in response to receiving the request for the template and based at least in part on the identifier for the content page, may identify the template to provide the loader. In some cases, the identifier for the content page may be included in the static content of the page supplied from the static content endpoint server to the client system.

Continuing with this example, based at least in part on the template received from the active content endpoint, the loader may determine active content files to download for the content page. In some cases, the loader may identify all active content files to download and request all active content files from the active content server at a same time.

Continuing with this example, as also depicted at 1010 and 1012, the loader executing on the client system may also request for downloading the filtering pipe method from the active content endpoint. In some cases, the filtering pipe method maybe included in the active content files, and in other cases, the filtering pipe method may be in a dedicated active content file. In this example, the loader may determine, according to the template and for each of the active content methods in the downloaded active content files, any suspect parameters to be passed to the active content methods.

Further in this example, the loader may, for each active content method, invoke the filtering pipe with a method identifier for an active content method and also with a set of suspect parameters. The filtering pipe, in response to being invoked from the loader, may request a config file from the active content endpoint if the config files has not been downloaded before, where the config file maps, or otherwise corresponds, methods with a filtering method or methods tailored specifically to clean the type of parameters expected by a method. In some cases, more than one filtering method may be called for different types of methods. Tailoring of filtering methods to expected parameter types may result in higher likelihoods of neutralizing or eliminating any attacks. However, if a given method is not mapped to a specific filtering method, or if the filtering method is otherwise unavailable, the filtering pipe may instead pass the suspect parameters to a generic filtering method, and then invoke the method with the results of the generic filtering method. In some cases, a given type of filtering method may be mapped to, and called from the filtering pipe, for multiple, different methods. For example, if different methods, performing different functions, accept a similar or a same type of parameter, then a single filtering method may be mapped to and used for both methods.

In different embodiments, the filtering methods may apply different approaches for removing threats from suspect parameters, as further described with regard to FIG. 7. For example, a filtering method may apply different types of whitelist filters and/or encoding filters to render any suspect data or parameters safe.

To continue this example, the filtering pipe may identify a filtering method to call for any parameters for an active content method. The filtering pipe may then invoke the filtering method with any parameters for the active content method, and receive a clean set of parameters from the filtering method when the filtering method is complete. At this point, the filtering pipe may invoke the active content method with the cleaned set of parameters. When control is passed back to the loader from the filtering pipe, the process may repeat for any remaining method calls.

In this way, what began with the loader loading a template for the content page to identify active content files, and with the loader using the filtering pipe to clean any parameters to the method calls in the active content files, at this point results in execution of one or more active content methods, and consequently, the generation of active content in the client application, as depicted at 1014. Consequently, active and static elements of the content page are rendered to produce an interactive, and safe, browsing experience for a user.

Figure 11:
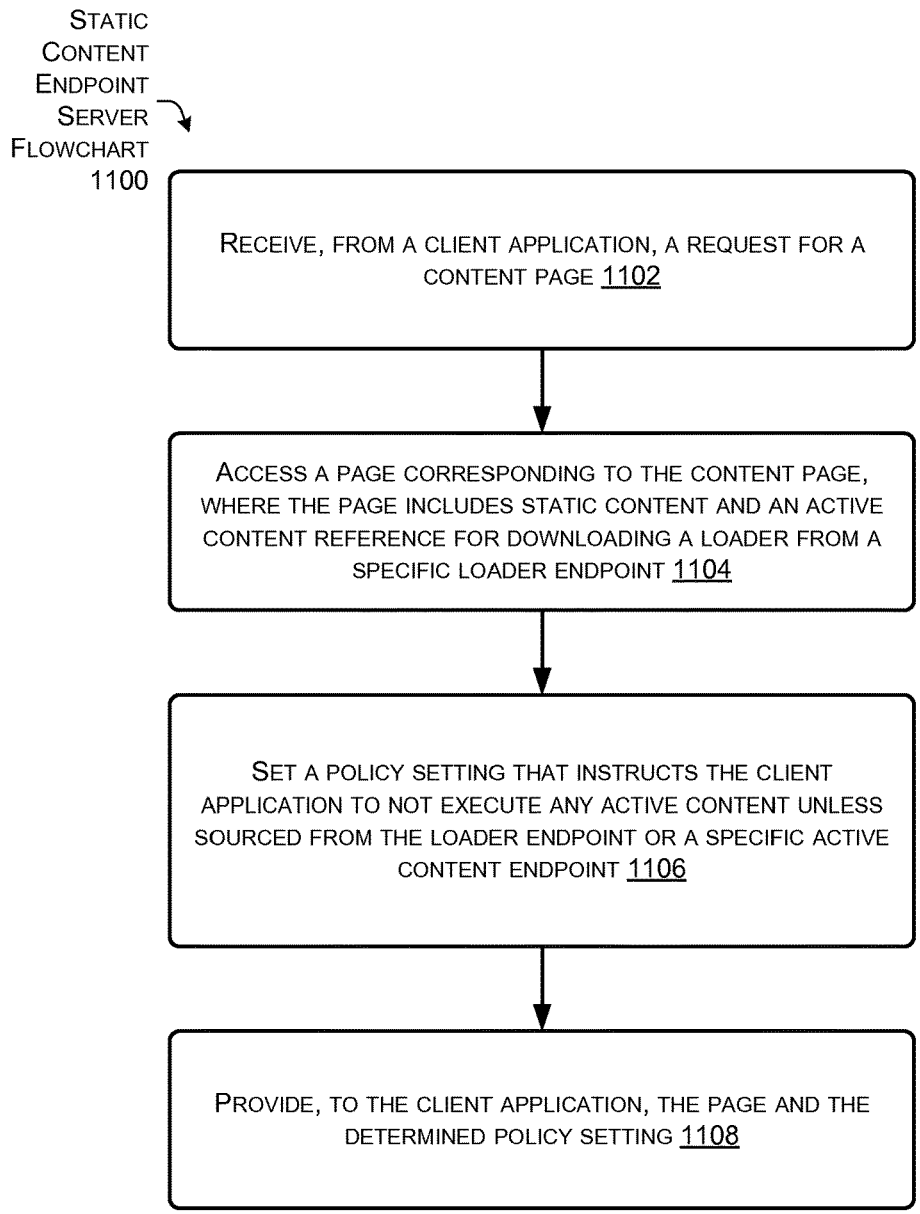
FIG. 11 is a flow diagram illustrating features of a static content endpoint server within an endpoint segregation system with three endpoint servers according to some implementations.

FIG. 11 illustrates flowchart 1100 depicting example operations performed on a static content endpoint server of the endpoint segregation system with three endpoints. As discussed above with regard to FIG. 10, a user may navigate to a website provided by an online business, such as, for example, when a user enters a URL for the online business.

In this example, the client application may request a content page, and as depicted at 1102, the static content endpoint server may receive this request for the content page from the client application on a client system.

In response to receiving the request for the content page, the static content endpoint server may access a page corresponding to the content page, as depicted at 1104. In this example, the page may include static content and an instance of active content reference such that when the active content reference is parsed on the client application, a download of a loader—from the loader endpoint—is invoked, where the loader, when downloaded and executed proceeds to download active content files from the active content endpoint.

As noted above, whether or not the page has been stripped of all active content prior to storage, given that the policy setting for the page instructs the client application to only allow content to execute if it was sourced from the loader endpoint, and given that the loader endpoint server does not have access to other active content files, whether or not any other active content in the page attempts to download active files from the loader endpoint server, such an attempt would yield no active content invocations. Therefore, in contrast to the static content endpoint server for the endpoint segregation system with two endpoints, no filtering is necessary to perform with this implementation of the static content endpoint server.

Continuing this example, the static content endpoint server may set a policy setting that may be applied by the client application, where the policy setting may be set within a header for a response message. As depicted at 1106, the policy setting may instruct the client application to not execute any content unless the content was sourced from the loader endpoint. In this example, such a definition of the policy setting may prevent the client application or client system itself from being a source of active content to execute, in addition to barring execution of content downloaded from the static content endpoint, the active content endpoint, and any other source.

At this point, to complete this example, the static content endpoint server may provide to the client system the page and also provide the determined policy setting to apply, as depicted at 1108. From this point, the client application has the page with static content, and may process the page as described earlier with regard to FIG. 10.

Figure 12:
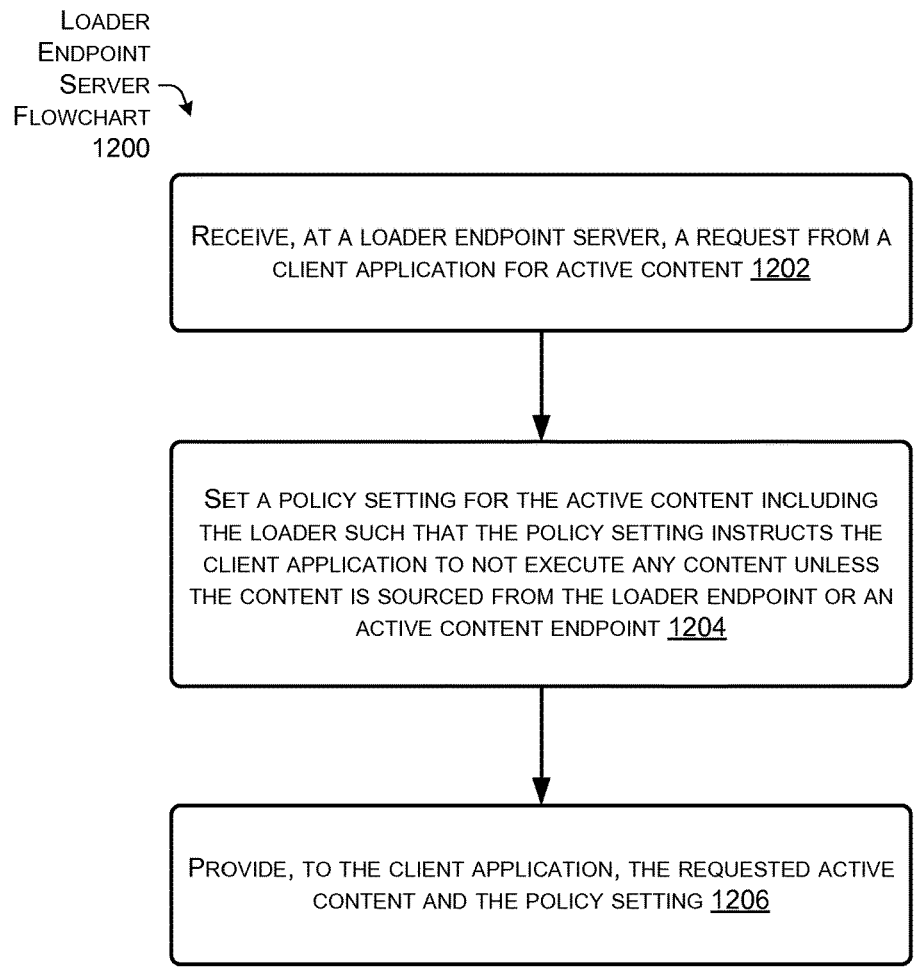
FIG. 12 is a flow diagram illustrating features of a loader endpoint within an endpoint segregation system with three endpoint servers according to some implementations.

FIG. 12 illustrates flowchart 1200 performed on a loader endpoint server of the endpoint segregation system with three endpoints. As discussed above with regard to FIG. 10, a user may navigate to a website provided by an online business, such as, for example, when a user enters a URL for the online business.

In this example, and as illustrated in FIG. 9, a loader endpoint server may store active content for implementing a loader. In this implementation, additional active content files for the content page are accessible from an active content endpoint server. As discussed above, in different embodiments, the loader endpoint server may have access to other files, including, for example, template files, the filtering pipe, and/or the filtering pipe config file or files.

In this implementation, the features described in flowchart 1200 are similar in responding to requests for any content from the client application. In other words, whether the request from the client application is for active content implementing the loader, the filtering pipe, the filtering methods, filtering pipe config files, or any other active or static content accessible from the loader endpoint, the loader endpoint processes the request similarly.

In this example, the loader endpoint server may receive a request from a client application for active content implementing the loader, as depicted at 1202. In response, the loader endpoint server may determine a policy setting to be applied by the client application, as depicted at 1204. In this example, the loader endpoint server may determine the policy to instruct the client application to not execute content unless the content is received from the loader endpoint or from the active content endpoint—to the exclusion of all other sources, including the client system and the static content endpoint.

After the loader endpoint server has accessed the active content requested, or in some cases, static content requested, the loader endpoint server may send the active or static content to the requesting client application, as depicted at 1206.

Figure 13:
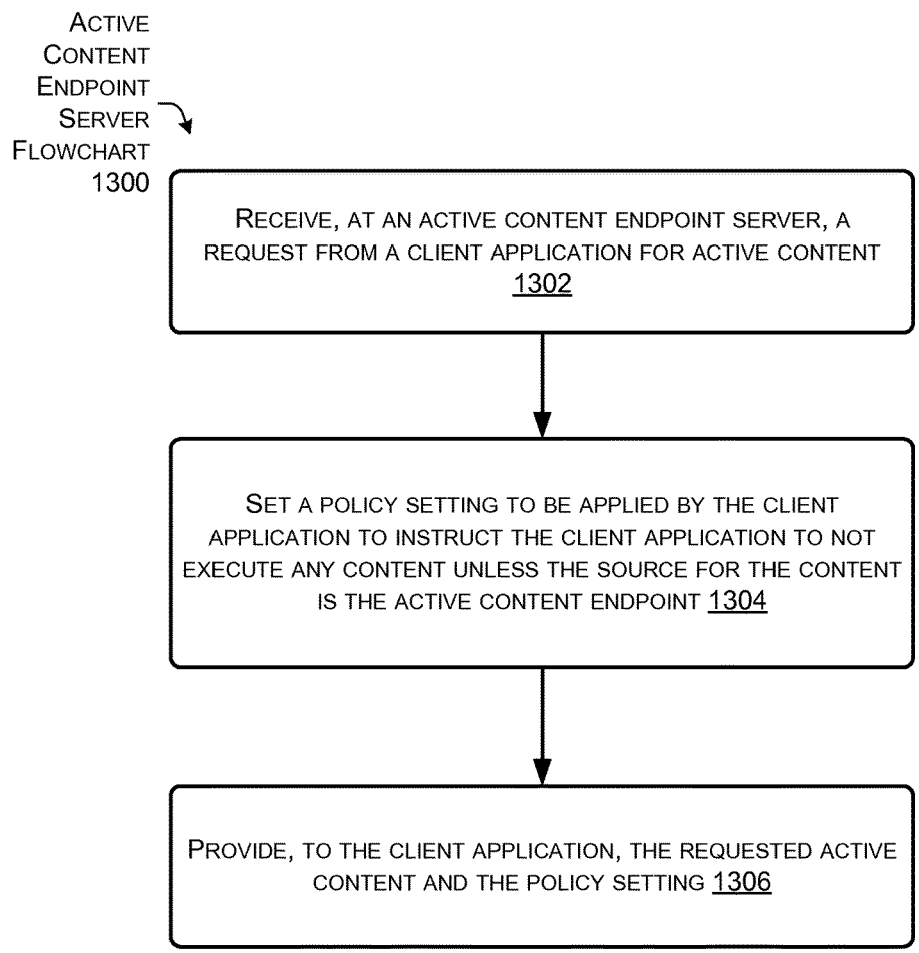
FIG. 13 is a flow diagram illustrating features of an active content endpoint server within an endpoint segregation system with three endpoint servers according to some implementations.

FIG. 13 illustrates flowchart 1300 depicting example operations performed on an active content endpoint server of the endpoint segregation system with three endpoints. As discussed above with regard to FIG. 10, a user may navigate to a website provided by an online business, such as, for example, when a user enters a URL for the online business.

In this example, and as illustrated in FIG. 9, an active content endpoint server may store active content for implementing a filtering pipe, filtering methods, and one or more active content files implementing one or more methods. Further in this example, the active content endpoint server may have access to templates and a filtering pipe config file.

In this implementation, the features described in flowchart 1300 are similar in responding to different requests for any content from the client system. In other words, whether the request from the client application is for active content implementing the filtering pipe, the filtering methods, filtering pipe config files, or any other active or static content accessible from the active content endpoint, the active content endpoint server processes the request similarly.

As one example, the active content endpoint server may receive a request from a client application for content, as depicted at 1302. As noted above, the content may be static or active. In response, the active content endpoint server may set a policy setting to be applied by the client application, as depicted at 1304. For example, the policy setting may be set within a header for a response message. In this example, the active content endpoint server may determine the policy setting to prevent execution of any content not sourced from the active content endpoint, to the exclusion of all other sources.

After the active content endpoint server has accessed the active content requested, or in some cases, static content requested, the active content endpoint server may send both the policy setting and the active or static content to the requesting system, in this example, the client application executing on the client system, as depicted at 1306.

Figure 14:
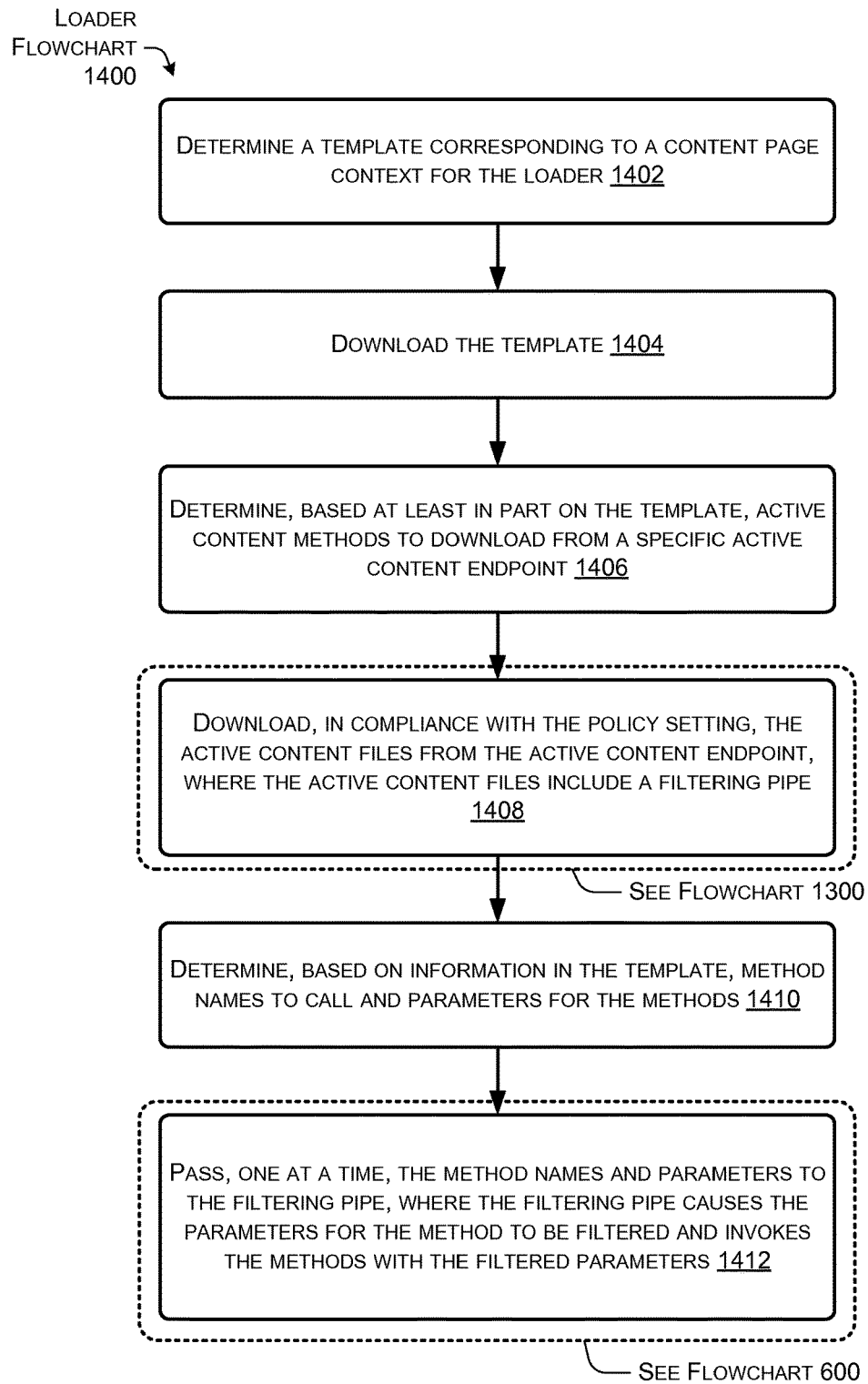
FIG. 14 is a flow diagram illustrating features of loader operating on a client system and interacting with an endpoint segregation system with three endpoint servers according to some implementations.

FIG. 14 illustrates flowchart 1400 depicting example operations performed on a client application executing a loader, for example, as described earlier with regard to FIG. 10. Further as discussed above with regard to FIG. 10, a user may navigate to a website provided by an online business, such as, for example, when a user enters a URL for the online business.

In this example, and as illustrated in FIG. 9, a static content endpoint server may store pages to serve to client applications requesting content pages corresponding to the pages, where the pages include static content and an instance of active content reference for downloading the loader. Flowchart 1400 begins when the client application downloads and invokes the loader from the loader endpoint, and the downloaded loader begins to execute. In this example, the requested content page provides the context for the loader In this example, the loader, to determine which active and/or static content files to download for a content page, may request, from the active content endpoint, a template corresponding to the content page context for the loader, where the template indicates which active content files to download for the requested content page. As depicted at 1402, the loader may use a content page identifier for the content page to determine a corresponding template.

This template may be downloaded, as depicted at 1404. In this example, the template is downloaded from the active content endpoint through a request for the template from the loader to the active content endpoint. However, in cases where the template does not include active content, the template may be requested from a location other than at the active content endpoint because the content security policy would not apply to static content. The loader, after a response from the active content endpoint, may receive the template for the content page in addition to receiving a corresponding content security policy to be applied.

The loader, based at least on the template for the content page, may determine active content files and methods to be invoked for the content page, where the active content files and methods are accessible from the active content endpoint server, as depicted at 1406. The loader may then download these active content files and methods, for example, though a message request to the specific active content endpoint, as depicted at 1408.

In this example, the active content files and methods downloaded from the active content server may include an implementation of a filtering pipe method. However, in other cases, the loader may download the filtering pipe method separately. Since the active content endpoint is an allowable source for executable content according to the content security policy, the download of these active content files and methods is allowed.

At this point, and based on information within the template for the content page, the loader may determine a method to invoke along with any parameters for the method, as depicted at 1410. In this example, the method identifier and any parameters to the method are passed to the filtering pipe, as depicted at 1412. Control now passes from the loader to the filtering pipe, where the filtering pipe proceeds to call a filtering method to clean the parameters to the method call before the filtering pipe invokes the method call with the cleaned parameters.

In this example, execution may then pass from the method call, which was invoked from the filtering pipe, back to the loader. The loader may then, for each remaining method call, based on information from the template, repeat the process of channeling any parameters to subsequent method calls to the filtering pipe before the filtering pipe invokes the subsequent method calls with cleaned parameters.

Further, features of the filtering pipe and filtering methods, once downloaded onto the client system, operate similarly in this embodiment as described above with regard to FIGS. 6 and 7.

Figure 15:
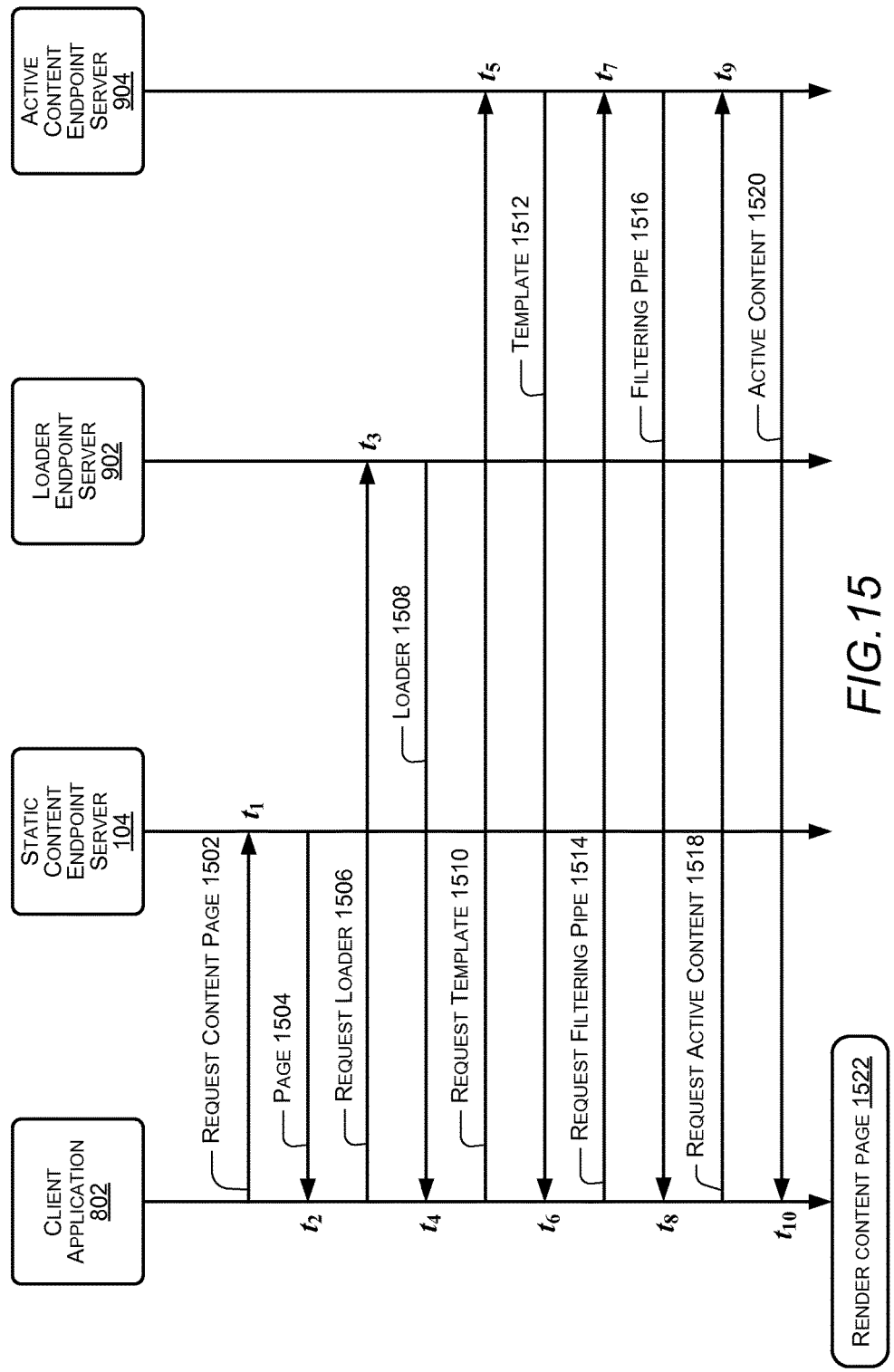
FIG. 15 illustrates an overview of communication activity between a client system, a static content endpoint server, a loader endpoint server, and an active content endpoint server within an endpoint segregation system with three endpoint servers according to some implementations.

FIG. 15 illustrates an overview of some communications between a client application 802 and endpoint servers of an endpoint segregation system with three endpoints, a static content endpoint server 104, a loader endpoint server 902, and an active content endpoint server 904. In different cases, more or fewer messages may be exchanged, including different types of messages. These example message exchanges are an overview of communication traffic that has been discussed above in greater detail with regard to FIGS. 10-15.

As discussed with regard to FIG. 10, a user navigating to a website using a client application may request a content page from a static content endpoint of an endpoint segregation system, as depicted by request for content page 1502. In this example, the request may be an HTTP message that is received at static content endpoint server 104 at time $t_1$.

In response to receiving the request for the content page, depicted as message 1502 received at time $t_1$, static content endpoint server 104 may access the page, which includes static content and corresponds to the requested content page, and send the page to the client application 802. Further, the message to the client application with the page may also specify a policy setting that, when applied at the client application, would instruct the client application to not execute any content unless the content was downloaded from a specified source, which in this example is the loader endpoint.

In response to receiving the page, depicted as message 1504 received at time $t_2$, the client application may apply the policy setting provided with the message delivering the page. The client application may then begin to render static elements of the page and also invoke the active content reference for downloading the loader from the loader endpoint, which generates a request for the loader 1506 sent to the loader endpoint.

In response to loader endpoint server 902 receiving the request for the loader from the client application, depicted as message 1506 received at time $t_3$, loader endpoint server 902 may respond with a message that includes the loader and a policy setting. For example, the loader may be delivered to the client application in an HTTP message body, where the message body may be a JavaScript file, and the policy setting may be specified in the HTTP message header.

In response to client application 802 receiving the loader from the loader endpoint, depicted as message 1508 received at time $t_4$, client application 802 may invoke the loader. The loader, once it begins to execute on the client application, may request a template from the active content endpoint. As discussed above, the template may be mapped to the particular content page downloaded to the client application, and the request message from the loader to the active content endpoint may include an indication of an identifier for the particular content page.

In response to active content endpoint server 904 receiving the request for the template from the loader on the client application, depicted as message 1520 received at time $t_5$, active content endpoint server 904 may send the template and a policy setting. For example, the request may include a content page identifier and active content endpoint server 904 may use the content page identifier to determine a corresponding template. In some cases, active content endpoint server 904 may store or have access to mapping information that maps content page identifiers to corresponding templates.

In response to the loader on client application 802 receiving the template, depicted as message 1512 received at time t6, client application 802 may apply the policy setting received in the message. At this point, the loader may use the template to determine which active content files may be needed for the content page. However, in this example, the loader does not invoke the method calls directly. Instead, the loader invokes a filtering pipe method to cause parameters to the method calls in the active content files to be filtered prior to the filtering pipe invoking the method calls. As such, at this point, the loader may request the active content file or files implementing the filtering pipe and also request the active content files. In different implementations, this may be done with a single request message, or as depicted in FIG. 15, with two request messages.

In response to the active content endpoint server 904 receiving a request for the filtering pipe, depicted as message 1514 received at time t7, active content endpoint server 904 may access and send the filtering pipe to the loader on the client application. Further, as with previous messages from the active content endpoint server, active content endpoints server 904 may set, within the message including the filtering pipe, a policy to instruct the client application to not execute any content unless the content was downloaded from the active content endpoint.

In response to the loader on client application 802 receiving the filtering pipe from the active content endpoint, depicted as message 1516 received at time t8, client application 802 may apply the policy setting included within the message delivering the filtering pipe. At this point, the loader may proceed to request the active content files determined based on the previously received template.

In response to active content endpoint server 904 receiving a request for the active content files, depicted as message 1518 received at time t9, active content endpoint server 904 may access and send the active content files. Further, active content endpoint server 904 may set, within the message including the active content files, a policy setting to instruct the client application to not execute any content unless sourced from the active content endpoint.

In response to the loader on client application 802 receiving the active content files from the active content endpoint, depicted as message 1520 received at time t10, the client application may apply the policy setting included within the message delivering the active content files. At this point, the loader may proceed to invoke the filtering pipe to filter parameters for the one or more methods calls within the active content files, where the filtering pipe, after filtering the parameters, invokes the one or more method calls with the filtered parameters.

In this way, static and active content is used to render a fully interactive content page on the client application for an engaging, and safe, user experience, as depicted at 1522.

Figure 16:
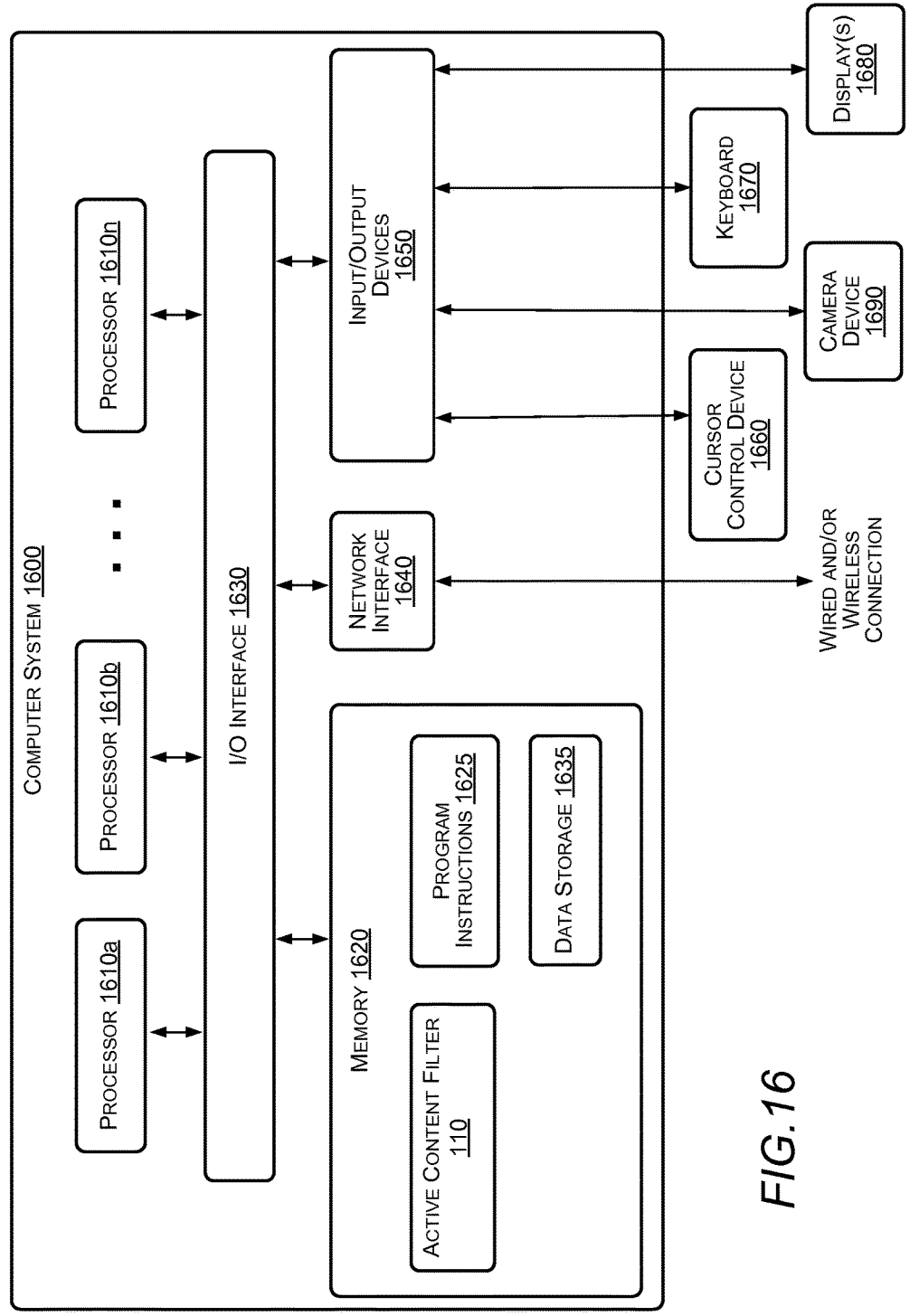
FIG. 16 illustrates a computer system and components of an endpoint segregation system according to some implementations.

FIG. 16 illustrates an example computer system, computer system 1600, where computer system 1600 may be configured to implement different endpoint servers within an endpoint segregation system, according to the discussed embodiments and examples. In different embodiments, the computer system may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a television, a video recording device, a peripheral device such as a switch, modem, router, or in general any type of computing or electronic device. Generally, the methods described herein may in various embodiments be implemented by any combination of hardware and software.

Further, the methods described herein may in various embodiments be implemented by any combination of hardware and software. For example, the methods may be implemented by computer system 1600 that includes one or more processors executing program instructions stored on a computer-readable storage medium coupled to the processors. The program instructions may be configured to implement the functionality described herein (e.g., the functionality of various servers and other components that implement the look-up component described herein). The various methods as illustrated in the figures and described herein represent example embodiments of methods. The order of any method may be changed, and various elements may be added, reordered, combined, omitted, or modified.

Computer system 1600 includes one or more processors 1610a-1610n (any of which may include multiple cores, which may be single or multi-threaded) coupled to a system memory 1620 via an input/output (I/O) interface 1630. Computer system 600 further includes a network interface 1640 coupled to I/O interface 1630. In various embodiments, computer system 1600 may be a uniprocessor system including one processor, or a multiprocessor system including several processors (e.g., two, four, eight, or another suitable number). Processors 1610 may be any suitable processors capable of executing instructions. For example, in various embodiments, processors 1610 may be general-purpose or embedded processors implementing any of a variety of instruction set architectures (ISAs), such as the x86, PowerPC, SPARC, or MIPS ISAs, or any other suitable ISA. In multiprocessor systems, each of processors 1610 may commonly, but not necessarily, implement the same ISA. The computer system 1600 also includes one or more network communication devices (e.g., network interface 1640) for communicating with other systems and/or components over a communications network (e.g. Internet, LAN, etc.). For example, a client application executing on system 1600 may use network interface 640 to communicate with a server application executing on a single server or on a cluster of servers that implement one or more of the components of the systems described herein. In another example, an instance of a server application executing on computer system 1600 may use network interface 1640 to communicate with other instances of the server application (or another server application) that may be implemented on other computer systems. Further, computer system 1600, via I/O interface 1630, may be coupled to one or more input/output devices 1650, such as cursor control device 1660, keyboard 1670, camera device 1690, and one or more displays 1680.

In the illustrated embodiment, computer system 1600 also includes one or more persistent storage devices and/or one or more I/O devices 1650. In various embodiments, persistent storage devices may correspond to disk drives, tape drives, solid state memory, other mass storage devices, or any other persistent storage device. Computer system 1600 (or a distributed application or operating system operating thereon) may store instructions and/or data in persistent storage devices, as desired, and may retrieve the stored instruction and/or data as needed. For example, in some embodiments, computer system 1600 may host a storage system server node, and persistent storage may include the SSDs attached to that server node.

Computer system 1600 includes one or more system memories 1620 that are configured to store instructions and data accessible by processor(s) 1610. In various embodiments, system memories 1620 may be implemented using any suitable memory technology, (e.g., one or more of cache, static random access memory (SRAM), DRAM, RDRAM, EDO RAM, DDR 10 RAM, synchronous dynamic RAM (SDRAM), Rambus RAM, EEPROM, non-volatile/Flash-type memory, or any other type of memory). System memory 1620 may contain program instructions 1625 that are executable by processor(s) 1610 to implement the methods and techniques described herein. In various embodiments, program instructions 1625 may be encoded in platform native binary, any interpreted language such as Java™ bytecode, or in any other language such as C/C++, Java™, etc., or in any combination thereof. For example, in the illustrated embodiment, program instructions 1625 include program instructions executable to implement the functionality of a database service, tracking-enabled client, update tracker, update listener, and/or update consumer in different embodiments. In some embodiments, program instructions 1625 may implement multiple separate clients, server nodes, and/or other components.

In some embodiments, program instructions 1625 may include instructions executable to implement an operating system (not shown), which may be any of various operating systems, such as UNIX, LINUX, Solaris™, MacOS™, Windows™, etc. Any or all of program instructions 1625 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 600 via I/O interface 630. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 600 as system memory 1620 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1640.

In some embodiments, system memory 1620 may include data store 1635, which may be configured as described herein. In general, system memory 1620 (e.g., data store 1635 within system memory 1620), persistent storage, and/or remote storage may store data blocks, replicas of data blocks, metadata associated with data blocks and/or their state, configuration information, and/or any other information usable in implementing the methods and techniques described herein. Further, data store 1620 may include modules for implementing an active content filter 110 in an embodiment of a static content endpoint server.

In one embodiment, I/O interface 1630 may be configured to coordinate I/O traffic between processor(s) 1610, system memory 1620 and any peripheral devices in the system, including through network interface 1640 or other peripheral interfaces. In some embodiments, I/O interface 1630 may perform any necessary protocol, timing or other data transformations to convert data signals from one component (e.g., system memory 1620) into a format suitable for use by another component (e.g., processor(s) 1610). In some embodiments, I/O interface 1630 may include support for devices attached through various types of peripheral buses, such as a variant of the Peripheral Component Interconnect (PCI) bus standard or the Universal Serial Bus (USB) standard, for example. In some embodiments, the function of I/O interface 1630 may be split into two or more separate components, such as a north bridge and a south bridge, for example. Also, in some embodiments, some or all of the functionality of I/O interface 1630, such as an interface to system memory 1620, may be incorporated directly into processor(s) 1610.

Network interface 1640 may be configured to allow data to be exchanged between computer system 1600 and other devices attached to a network, such as other computer systems (which may implement one or more storage system server nodes, database engine head nodes, and/or clients of the database systems described herein), for example. In addition, network interface 1640 may be configured to allow communication between computer system 1600 and various I/O devices 1650 and/or remote storage. Input/output devices 1650 may, in some embodiments, include one or more display terminals, keyboards, keypads, touchpads, scanning devices, voice or optical recognition devices, or any other devices suitable for entering or retrieving data by one or more computer systems 1600. Multiple input/output devices 1650 may be present in computer system 1600 or may be distributed on various nodes of a distributed system that includes computer system 1600. In some embodiments, similar input/output devices may be separate from computer system 1600 and may interact with one or more nodes of a distributed system that includes computer system 1600 through a wired or wireless connection, such as over network interface 1640. Network interface 1640 may commonly support one or more wireless networking protocols (e.g., Wi-Fi/IEEE 802.11, or another wireless networking standard). However, in various embodiments, network interface 1640 may support communication via any suitable wired or wireless general data networks, such as other types of Ethernet networks, for example. Additionally, network interface 1640 may support communication via telecommunications/telephony networks such as analog voice networks or digital fiber communications networks, via storage area networks such as Fibre Channel SANs, or via any other suitable type of network and/or protocol. In various embodiments, computer system 1600 may include more, fewer, or different components than those illustrated (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

The foregoing embodiments may be better understood in view of the following clauses:

1. A system, comprising:
   a static content endpoint server implemented by one or more hardware computing devices, wherein the static content endpoint server is configured to:
   receive a content page request from a client application;
   generate a content page response to the content page request, wherein the content page response comprises a page including static content for the requested content page, an active content source reference that instructs the client application to download an active content loader from an active content endpoint, and a first policy setting that instructs the client application to not execute any active content for the content page unless the source of the active content is the active content endpoint;
   provide the content page response to the client application;

an active content endpoint server implemented by one or more hardware computing devices, wherein the active content endpoint server is configured to:
    receive a loader request from the client application for the active content loader, wherein the active content loader is configured to execute at the client application to download, from the active content endpoint, one or more active content files for active content specified for the content page and a filtering pipe for the active content specified for the content page, wherein the filtering pipe is configured to execute at the client application to filter parameters for methods of the active content files prior to the methods executing at the client application;
    generate a loader response to the loader request, wherein the loader response comprises the active content loader and a second policy setting that instructs the client application to not execute any active content for the content page unless the source of the active content is the active content endpoint; and
    provide the loader response to the client application; and
    receive, from the active content loader at the client application, an active content request for the one or more active content files for active content specified for the content page;
    generate an active content response to the active content request, wherein the active content response comprises the one or more active content files and the second policy setting that instructs the client application to not execute any active content for the content page unless the source of the active content is the active content endpoint; and
    provide the active content response to the client application.

2. The system of clause 1, wherein the page is among a plurality of pages accessible from the static content endpoint server, wherein to generate the content page response to the content page request, the static content endpoint server is further configured to:
    filter the page to remove active content source reference instructions except for the active content source reference that instructs the client application to download the active content loader from the active content endpoint;
    include the page in the content page response without filtering the page to remove active content; and
    set the first policy setting within the content page response.

3. The system of clauses 1 to 2, wherein the active content endpoint server is further configured to:
    receive a request from the client application for a template for the content page, wherein the template specifies the active content files for the content page; and
    provide the template to the client application.

4. The system of clauses 1 to 3, wherein the template further specifies method names of the methods of the active content files to be called and parameters to the methods, wherein the filtering pipe obtains the method names and parameters specified in the template in order to filter the parameters prior to the methods executing at the client application.

5. The system of clauses 1 to 4, wherein the active content loader provided from the active content server examines the template to determine the active content files to request from the active content endpoint.

6. The system of clauses 1 to 5, wherein the active content endpoint server is further configured to:
    receive a request from the client application for a filtering pipe configuration file corresponding to the content page, wherein the filtering pipe configuration file includes mapping information between the methods of the active content files and filtering methods; and
    provide the filtering pipe configuration file to the client application;
    wherein to filter parameters for the methods of the active content files prior to the methods executing at the client application, the filtering pipe is configured to, for each given method of the methods of the active content files:
        examine the filtering pipe configuration file to determine a filtering method to apply for the given method to be invoked;
        call the determined filtering method to filter parameters for the given method to generate a filtered set of parameters; and
        invoke the given method with the filtered set of parameters.

7. The system of clauses 1 to 6, wherein to determine the filtering method to apply for the given method of the methods of the active content files, the filtering pipe is further configured to:
    determine, based on an examination of the filtering pipe configuration file, that no filtering method is mapped to the given method of the methods of the active content files; and
    determine the filtering method to apply to be a default filtering method.

8. The system of clauses 1 to 7, wherein the active content endpoint server is further configured to:
    receive a request from the client application for the filtering methods; and
    provide the filtering methods to the client application;
    wherein a given filtering method of the filtering methods is configured to, in response to being invoked with a method identifier and a suspect set of parameters:
        apply a whitelist filter to the suspect set of parameters, wherein the whitelist filter is defined based at least on a type of parameters expected for a method corresponding to the method identifier, or
        identify one or more portions of the suspect set of parameters interpretable by the client application as active content and encode the identified one or more portions to not be interpretable by the client application as active content.

9. The system of clauses 1 to 8, wherein to generate the content page response to the content page request, the static content endpoint server is further configured to:
    generate a Hypertext Transfer Protocol (HTTP) message, wherein the HTTP message includes:
        a message header specifying the first policy setting as an HTTP content security policy; and
        a Hypertext Markup Language (HTML) message body including the page.

10. The system of clauses 1 to 9, wherein to generate the content page response to the content page request, the static content endpoint server is further configured to:
    insert a Hypertext Markup Language tag within the page specifying the first policy setting as a Hypertext Transfer Protocol content security policy.

11. A method, comprising:
    performing by one or more servers of a static content endpoint, in response to receiving a content page request from a client application:

generating a content page response to the content page request, wherein the content page response comprises a page including static content for the requested content page, an active content source reference that instructs the client application to download an active content loader from an active content endpoint, and a first policy setting that instructs the client application to not execute any active content for the content page unless sourced from the active content endpoint;

providing the content page response to the client application; and performing by one or more servers of the active content endpoint:

in response to receiving a loader request from the client application for the active content loader:

generating a loader response to the loader request, wherein the active content loader is configured to execute at the client application to download, from the active content endpoint, one or more active content files for active content specified for the content page and a filtering pipe for the active content specified for the content page, and wherein the loader response comprises the active content loader and a second policy setting that instructs the client application to not execute any active content for the content page unless sourced from the active content endpoint; and providing the loader response to the client application; and in response to receiving an active content request from the active content loader at the client application:

generating an active content response to the active content request, wherein the active content request specifies one or more active content files for active content specified for the content page, and wherein the active content response comprises the one or more active content files and the second policy setting; and providing the active content response to the client application.

12. The method of clause 11, wherein the page is among a plurality of pages, and wherein said generating the content page response to the content page request further comprises:

filtering the page to remove active content source reference instructions except for the active content source reference that instructs the client application to download the active content loader from the active content endpoint;

including the page in the content page response without filtering the page to remove active content; and setting the first policy setting within the content page response.

13. The method of clauses 11 to 12, further comprising:

in response to receiving a template request from the client application for a template for the content page:

generating template response to the request for the template, wherein the template response comprises the template and the third policy setting, and wherein the template specifies the active content files for the content page; and providing the template response to the client application.

14. The method of clauses 11 to 13, wherein the template further specifies method names of the methods of the active content files to be called and parameters to the methods, wherein the filtering pipe obtains the method names and parameters specified in the template in order to filter the parameters prior to the methods executing at the client application.

15. The method of clauses 11 to 14, further comprising:

in response to receiving a filtering pipe configuration file request from the client application for the filtering pipe configuration file for the content page:

generating a filtering pipe configuration file response comprising the filtering pipe configuration file and the third policy setting, wherein the filtering pipe configuration file includes mapping information between the methods of the active content files and filtering methods, and wherein the mapping information is specified for the filtering pipe to perform, for methods of the active content files prior to the methods executing at the client application, and for a given method of the methods of the active content files:

examining the filtering pipe configuration file to determine a filtering method to apply for the given method to be invoked;

calling the determined filtering method to filter parameters for the given method to generate a filtered set of parameters; and invoking the given method with the filtered set of parameters; and providing the filtering pipe configuration file response to the client application.

16. The method of clauses 11 to 15, further comprising:

in response to receiving a filtering method request from the client application for the filtering methods:

generating a filtering methods response comprising the filtering methods and the third policy setting, wherein a given filtering method performs, in response to being invoked with a method identifier and a suspect set of parameters:

applying a whitelist filter to the suspect set of parameters, wherein the whitelist filter is defined based at least on a type of parameters expected for a method corresponding to the method identifier, or identifying one or more portions of the suspect set of parameters interpretable by the client application as active content and encode the identified one or more portions to not be interpretable by the client application as active content; and providing the filtering methods response to the client application.

17. A method, comprising:

performing, by one or more computer devices:

receiving, from one or more servers for a static content endpoint, a page and a first policy setting, wherein the page includes static content for the content page and an active content source reference that instructs a client application to download an active content loader from a particular active content endpoint, and wherein the first policy setting instructs the client application to not execute any active content for the content page unless the source of the active content is the particular active content endpoint;

applying the first policy setting to prevent execution of any active content for the content page unless a source of the active content is the particular active content endpoint;

downloading, based at least in part on the active content source reference in the page, the active content loader and a second policy setting from the particular active content endpoint;

applying the second policy setting to prevent execution of any active content for the content page unless a source of the active content is the particular active content endpoint; and executing the active content loader, wherein said executing the active content loader comprises:

downloading, from one or more servers of the particular active content endpoint, a filtering pipe and the one or more active content files for active content specified for the content page; and executing the filtering pipe, wherein said executing the filtering pipe comprises filtering parameters for one or more methods of the one or more active content files prior to executing the one or more methods to generate active content for the content page.

18. The method of clause 17, further comprising:

prior to said downloading the one or more active content files:

downloading, in response to a request for a template to the particular active content endpoint, a template specifying the one or more active content files and specifying method names of the methods of the active content files to be called and parameters to the methods, wherein the filtering pipe obtains the method names and parameters specified in the template in order to filter the parameters prior to the methods executing at the client application.

19. The method of clauses 17 to 18, further comprising:

downloading, in response to a request for filtering methods to the particular active content endpoint, the filtering methods;

downloading, in response to a request for a filtering pipe configuration file to the particular active content endpoint, the filtering pipe configuration file; and wherein said executing the filtering pipe comprises, for each given method of the methods of the active content files:

examining the filtering pipe configuration file to determine a filtering method to apply for the given method to be invoked;

calling the determined filtering method to filter parameters for the given method to generate a filtered set of parameters; and invoking the given method with the filtered set of parameters.

20. The method of clauses 17 to 19, wherein the determined filtering method, in response to being called with a method identifier and a suspect set of parameters, performs:

applying a whitelist filter to the suspect set of parameters, wherein the whitelist filter is defined based at least on a type of parameters expected for a method corresponding to the method identifier, or identifying one or more portions of the suspect set of parameters interpretable by the client application as active content and encode the identified one or more portions to not be interpretable by the client application as active content.

In addition, the foregoing embodiments may be better understood in view of the following clauses:

1. A system, comprising:

a static content endpoint server implemented by one or more hardware computing devices, wherein the static content endpoint server is configured to:

receive a content page request from a client application;

generate a content page response to the content page request, wherein the content page response comprises a page including static content for the requested content page, an active content source reference that instructs the client application to download an active content loader from a loader endpoint, and a first policy setting that instructs the client application to not execute any active content for the content page unless the source of the active content is the loader endpoint;

provide the content page response to the client application;

a loader endpoint server implemented by one or more hardware computing devices, wherein the loader endpoint server is configured to:

receive a loader request from the client application for the active content loader, wherein the active content loader is configured to execute at the client application to download, from an active content endpoint, one or more active content files for active content specified for the content page and a filtering pipe for the active content specified for the content page, wherein the filtering pipe is configured to execute at the client application to filter parameters for methods of the active content files prior to the methods executing at the client application;

generate a loader response to the loader request, wherein the loader response comprises the active content loader and a second policy setting that instructs the client application to not execute any active content for the content page unless the source of the active content is the loader endpoint or the active content endpoint; and provide the loader response to the client application; and an active content endpoint server implemented by one or more hardware computing devices, wherein the active content endpoint server is configured to:

receive, from the active content loader at the client application, an active content request for the one or more active content files for active content specified for the content page;

generate an active content response to the active content request, wherein the active content response comprises the one or more active content files and a third policy setting that instructs the client application to not execute any active content for the content page unless the source of the active content is the active content endpoint; and provide the active content response to the client application.

2. The system of clause 1, wherein the page is among a plurality of pages accessible from the static content endpoint server, wherein to generate the content page response to the content page request, the static content endpoint server is further configured to:

include the page in the content page response without filtering the page to remove source reference instructions for downloading active content; and set the first policy setting within the content page response.

3. The system of clauses 1 to 2, wherein the active content endpoint server is further configured to:

receive a request from the client application for a template for the content page, wherein the template specifies the active content files for the content page; and provide the template to the client application.

4. The system of clauses 1 to 3, wherein the template further specifies method names of the methods of the active content files to be called and parameters to the methods, wherein the filtering pipe obtains the method names and parameters specified in the template in order to filter the parameters prior to the methods executing at the client application.

5. The system of clauses 1 to 4, wherein the active content loader provided from the loader endpoint server examines the template to determine the active content files to request from the active content endpoint.

6. The system of clauses 1 to 5, wherein the active content endpoint server is further configured to:
receive a request from the client application for a filtering pipe configuration file corresponding to the content page, wherein the filtering pipe configuration file includes mapping information between the methods of the active content files and filtering methods; and
provide the filtering pipe configuration file to the client application;
wherein to filter parameters for the methods of the active content files prior to the methods executing at the client application, the filtering pipe is configured to, for each given method of the methods of the active content files:
examine the filtering pipe configuration file to determine a filtering method to apply for the given method to be invoked;
call the determined filtering method to filter parameters for the given method to generate a filtered set of parameters; and
invoke the given method with the filtered set of parameters.

7. The system of clauses 1 to 6, wherein to determine the filtering method to apply for the given method of the methods of the active content files, the filtering pipe is further configured to:
determine, based on an examination of the filtering pipe configuration file, that no filtering method is mapped to the given method of the methods of the active content files; and
determine the filtering method to apply to be a default filtering method.

8. The system of clauses 1 to 7, wherein the active content endpoint server is further configured to:
receive a request from the client application for the filtering methods; and
provide the filtering methods to the client application;
wherein a given filtering method of the filtering methods is configured to, in response to being invoked with a method identifier and a suspect set of parameters:
apply a whitelist filter to the suspect set of parameters, wherein the whitelist filter is defined based at least on a type of parameters expected for a method corresponding to the method identifier, or
identify one or more portions of the suspect set of parameters interpretable by the client application as active content and encode the identified one or more portions to not be interpretable by the client application as active content.

9. The system of clauses 1 to 8, wherein to generate the content page response to the content page request, the static content endpoint server is further configured to:
generate a Hypertext Transfer Protocol (HTTP) message, wherein the HTTP message includes:
a message header specifying the first policy setting as an HTTP content security policy; and
a Hypertext Markup Language (HTML) message body including the page.

10. The system of clauses 1 to 9, wherein the loader endpoint server does not serve active content other than the active content loader.

11. A method, comprising:
performing, by one or more servers of a static content endpoint, in response to receiving a content page request from a client application:
generating a content page response to the content page request, wherein the content page response comprises a page including static content for the requested content page, an active content source reference that instructs the client application to download an active content loader from a loader endpoint, and a first policy setting that instructs the client application to not execute any active content for the content page unless sourced from the loader endpoint;
providing the content page response to the client application;
performing, by one or more servers of the loader endpoint, in response to receiving a loader request from the client application for the active content loader:
generating a loader response to the loader request, wherein the active content loader is configured to execute at the client application to download, from an active content endpoint, one or more active content files for active content specified for the content page and a filtering pipe for the active content specified for the content page, and wherein the loader response comprises the active content loader and a second policy setting that instructs the client application to not execute any active content for the content page unless sourced from either the loader endpoint or the active content endpoint; and
providing the loader response to the client application; and
performing, by one or more servers of the active content endpoint, in response to receiving an active content request from the active content loader at the client application:
generating an active content response to the active content request, wherein the active content request specifies one or more active content files for active content specified for the content page, and wherein the active content response comprises the one or more active content files and a third policy setting that instructs the client application to not execute any active content for the content page unless sourced from the active content endpoint; and
providing the active content response to the client application.

12. The method of clause 11, wherein the page is among a plurality of pages, and wherein said generating the content page response to the content page request further comprises:
including the page in the content page response without filtering the page to remove source reference instructions for downloading active content; and
setting the first policy setting within the content page response.

13. The method of clauses 11 to 12, further comprising:
in response to receiving a template request from the client application for a template for the content page:
generating template response to the request for the template, wherein the template response comprises the template and the third policy setting, and wherein the template specifies the active content files for the content page; and providing the template response to the client application.

14. The method of clauses 11 to 13, wherein the template further specifies method names of the methods of the active content files to be called and parameters to the methods, wherein the filtering pipe obtains the method names and parameters specified in the template in order to filter the parameters prior to the methods executing at the client application.

15. The method of clauses 11 to 14, further comprising:
in response to receiving a filtering pipe configuration file request from the client application for the filtering pipe configuration file for the content page:
generating a filtering pipe configuration file response comprising the filtering pipe configuration file and the third policy setting, wherein the filtering pipe configuration file includes mapping information between the methods of the active content files and filtering methods, and wherein the mapping information is specified for the filtering pipe to perform, for methods of the active content files prior to the methods executing at the client application, and for a given method of the methods of the active content files:
examining the filtering pipe configuration file to determine a filtering method to apply for the given method to be invoked;
calling the determined filtering method to filter parameters for the given method to generate a filtered set of parameters; and
invoking the given method with the filtered set of parameters; and
providing the filtering pipe configuration file response to the client application.

16. The method of clauses 11 to 15, further comprising:
in response to receiving a filtering method request from the client application for the filtering methods:
generating a filtering methods response comprising the filtering methods and the third policy setting, wherein a given filtering method performs, in response to being invoked with a method identifier and a suspect set of parameters:
applying a whitelist filter to the suspect set of parameters, wherein the whitelist filter is defined based at least on a type of parameters expected for a method corresponding to the method identifier, or
identifying one or more portions of the suspect set of parameters interpretable by the client application as active content and encode the identified one or more portions to not be interpretable by the client application as active content; and
providing the filtering methods response to the client application.

17. A method, comprising:
performing, by one or more computer devices:
receiving, from one or more servers for a static content endpoint, a page and a first policy setting, wherein the page includes static content for the requested content page and an active content source reference that instructs a client application to download an active content loader from a particular loader endpoint, and wherein the first policy setting instructs the client application to not execute any active content for the content page unless the source of the active content is the particular loader endpoint;
applying the first policy setting to prevent execution of any active content for the content page unless a source of the active content is the particular loader endpoint;
downloading, based at least in part on the active content source reference in the page, the active content loader and a second policy setting from the particular loader endpoint;
applying the second policy setting to prevent execution of any active content for the content page unless a source of the active content is the particular loader endpoint or a particular active content endpoint; and
executing the active content loader, wherein said executing the active content loader comprises:
downloading, from one or more servers of the particular active content endpoint, a filtering pipe and the one or more active content files for active content specified for the content page; and
executing the filtering pipe, wherein said executing the filtering pipe comprises filtering parameters for one or more methods of the one or more active content files prior to executing the one or more methods to generate active content for the content page.

18. The method of clause 17, further comprising:
prior to said downloading the one or more active content files:
downloading, in response to a request for a template to the particular active content endpoint, a template specifying the one or more active content files and specifying method names of the methods of the active content files to be called and parameters to the methods, wherein the filtering pipe obtains the method names and parameters specified in the template in order to filter the parameters prior to the methods executing at the client application.

19. The method of clauses 17 to 18, further comprising:
downloading, in response to a request for filtering methods to the particular active content endpoint, the filtering methods;
downloading, in response to a request for a filtering pipe configuration file to the particular active content endpoint, the filtering pipe configuration file; and
wherein said executing the filtering pipe comprises, for each given method of the methods of the active content files:
examining the filtering pipe configuration file to determine a filtering method to apply for the given method to be invoked;
calling the determined filtering method to filter parameters for the given method to generate a filtered set of parameters; and
invoking the given method with the filtered set of parameters.

20. The method of clauses 17 to 19, wherein the determined filtering method, in response to being called with a method identifier and a suspect set of parameters, performs:
applying a whitelist filter to the suspect set of parameters, wherein the whitelist filter is defined based at least on a type of parameters expected for a method corresponding to the method identifier, or
identifying one or more portions of the suspect set of parameters interpretable by the client application as active content and encode the identified one or more portions to not be interpretable by the client application as active content.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system, comprising:
a static content endpoint server implemented by one or more hardware computing devices, wherein the static content endpoint server is configured to:
receive a content page request from a client application;
generate a content page response to the content page request, wherein the content page response comprises a page including static content for the requested content page, an active content source reference that instructs the client application to download an active content loader from an active content endpoint, and a first policy setting that instructs the client application to not execute any active content for the content page unless a source of active content is the active content endpoint; and
provide the content page response to the client application from a static content endpoint that is distinct from the active content endpoint;
an active content endpoint server implemented by one or more hardware computing devices, wherein the active content endpoint server is configured to:
receive a loader request from the client application for the active content loader, wherein the active content loader is configured to execute at the client application to download, from the active content endpoint, one or more active content files for active content specified for the content page and a filtering pipe for the active content specified for the content page, wherein the filtering pipe is configured to execute at the client application to filter parameters for methods of the active content files prior to the methods executing at the client application;
generate a loader response to the loader request, wherein the loader response comprises the active content loader and a second policy setting that instructs the client application to not execute any active content for the content page unless a source of active content is the active content endpoint;
provide the loader response to the client application from the active content endpoint;
receive, from the active content loader at the client application, an active content request for the one or more active content files for active content specified for the content page;
generate an active content response to the active content request, wherein the active content response comprises the one or more active content files and the second policy setting that instructs the client application to not execute any active content for the content page unless the source of the active content is the active content endpoint; and
provide the active content response to the client application from the active content endpoint.

2. The system of claim 1, wherein the page is among a plurality of pages accessible from the static content endpoint server, wherein to generate the content page response to the content page request, the static content endpoint server is further configured to:
filter the page to remove active content source reference instructions except for the active content source reference that instructs the client application to download the active content loader from the active content endpoint;
include the page in the content page response without filtering the page to remove active content; and
set the first policy setting within the content page response.

3. The system of claim 1, wherein the active content endpoint server is further configured to:
receive a request from the client application for a template for the content page, wherein the template specifies the active content files for the content page; and
provide the template to the client application.

4. The system of claim 3, wherein the template further specifies method names of the methods of the active content files to be called and parameters to the methods, wherein the filtering pipe obtains the method names and parameters specified in the template in order to filter the parameters prior to the methods executing at the client application.

5. The system of claim 3, wherein the active content loader provided from the active content server examines the template to determine the active content files to request from the active content endpoint.

6. The system of claim 1, wherein the active content endpoint server is further configured to:
receive a request from the client application for a filtering pipe configuration file corresponding to the content page, wherein the filtering pipe configuration file includes mapping information between the methods of the active content files and filtering methods; and
provide the filtering pipe configuration file to the client application;
wherein to filter parameters for the methods of the active content files prior to the methods executing at the client application, the filtering pipe is configured to, for each given method of the methods of the active content files:
examine the filtering pipe configuration file to determine a filtering method to apply for the given method to be invoked;
call the determined filtering method to filter parameters for the given method to generate a filtered set of parameters; and
invoke the given method with the filtered set of parameters.

7. The system of claim 6, wherein to determine the filtering method to apply for the given method of the methods of the active content files, the filtering pipe is further configured to:
determine, based on an examination of the filtering pipe configuration file, that no filtering method is mapped to the given method of the methods of the active content files; and
determine the filtering method to apply to be a default filtering method.

8. The system of claim 6, wherein the active content endpoint server is further configured to:
receive a request from the client application for the filtering methods; and
provide the filtering methods to the client application;
wherein a given filtering method of the filtering methods is configured to, in response to being invoked with a method identifier and a suspect set of parameters:

apply a whitelist filter to the suspect set of parameters, wherein the whitelist filter is defined based at least on a type of parameters expected for a method corresponding to the method identifier, or identify one or more portions of the suspect set of parameters interpretable by the client application as active content and encode the identified one or more portions to not be interpretable by the client application as active content.

9. The system of claim 1, wherein to generate the content page response to the content page request, the static content endpoint server is further configured to:

generate a Hypertext Transfer Protocol (HTTP) message, wherein the HTTP message includes:
a message header specifying the first policy setting as an HTTP content security policy; and
a Hypertext Markup Language (HTML) message body including the page.

10. The system of claim 1, wherein to generate the content page response to the content page request, the static content endpoint server is further configured to:

insert a Hypertext Markup Language tag within the page specifying the first policy setting as a Hypertext Transfer Protocol content security policy.

11. A method, comprising:

performing by one or more servers of a static content endpoint, in response to receiving a content page request from a client application:
generating a content page response to the content page request, wherein the content page response comprises a page including static content for the requested content page, an active content source reference that instructs the client application to download an active content loader from an active content endpoint, and a first policy setting that instructs the client application to not execute any active content for the content page unless sourced from the active content endpoint;
providing the content page response to the client application from a static content endpoint that is distinct from the active content endpoint; and performing by one or more servers of the active content endpoint:
in response to receiving a loader request from the client application for the active content loader:
generating a loader response to the loader request, wherein the active content loader is configured to execute at the client application to download, from the active content endpoint, one or more active content files for active content specified for the content page and a filtering pipe for the active content specified for the content page, and wherein the loader response comprises the active content loader and a second policy setting that instructs the client application to not execute any active content for the content page unless sourced from the active content endpoint; and
providing the loader response to the client application from the active content endpoint; and in response to receiving an active content request from the active content loader at the client application:
generating an active content response to the active content request, wherein the active content request specifies one or more active content files for active content specified for the content page, and wherein the active content response comprises the one or more active content files and the second policy setting; and
providing the active content response to the client application from the active content endpoint.

12. The method of claim 11, wherein the page is among a plurality of pages, and wherein said generating the content page response to the content page request further comprises:
filtering the page to remove active content source reference instructions except for the active content source reference that instructs the client application to download the active content loader from the active content endpoint;
including the page in the content page response without filtering the page to remove active content; and
setting the first policy setting within the content page response.

13. The method of claim 11, further comprising:
in response to receiving a template request from the client application for a template for the content page:
generating a template response to the request for the template, wherein the template response comprises the template and a third policy setting, and wherein the template specifies the active content files for the content page; and
providing the template response to the client application.

14. The method of claim 13, wherein the template further specifies method names of the methods of the active content files to be called and parameters to the methods, wherein the filtering pipe obtains the method names and parameters specified in the template in order to filter the parameters prior to the methods executing at the client application.

15. The method of claim 11, further comprising:
in response to receiving a filtering pipe configuration file request from the client application for the filtering pipe configuration file for the content page:
generating a filtering pipe configuration file response comprising the filtering pipe configuration file and a third policy setting, wherein the filtering pipe configuration file includes mapping information between the methods of the active content files and filtering methods, and wherein the mapping information is specified for the filtering pipe to perform, for methods of the active content files prior to the methods executing at the client application, and for a given method of the methods of the active content files:
examining the filtering pipe configuration file to determine a filtering method to apply for the given method to be invoked;
calling the determined filtering method to filter parameters for the given method to generate a filtered set of parameters; and
invoking the given method with the filtered set of parameters; and
providing the filtering pipe configuration file response to the client application.

16. The method of claim 15, further comprising:
in response to receiving a filtering method request from the client application for the filtering methods:
generating a filtering methods response comprising the filtering methods and a third policy setting, wherein a given filtering method performs, in response to being invoked with a method identifier and a suspect set of parameters:

applying a whitelist filter to the suspect set of parameters, wherein the whitelist filter is defined based at least on a type of parameters expected for a method corresponding to the method identifier, or identifying one or more portions of the suspect set of parameters interpretable by the client application as active content and encode the identified one or more portions to not be interpretable by the client application as active content; and providing the filtering methods response to the client application.

17. A method, comprising: performing, by one or more computer devices:

receiving, from one or more servers for a static content endpoint, a page and a first policy setting, wherein the page includes static content for a requested content page and an active content source reference that instructs a client application to download an active content loader from a particular active content endpoint that is distinct from the static content endpoint, and wherein the first policy setting instructs the client application to not execute any active content for the content page unless a source of the active content is the particular active content endpoint;

applying the first policy setting to prevent execution of any active content for the content page unless a source of active content is the particular active content endpoint;

downloading, based at least in part on the active content source reference in the page, the active content loader and a second policy setting from the particular active content endpoint;

applying the second policy setting to prevent execution of any active content for the content page unless a source of active content is the particular active content endpoint; and executing the active content loader, wherein said executing the active content loader comprises:

downloading, from one or more servers of the particular active content endpoint, a filtering pipe and one or more active content files for active content specified for the content page; and executing the filtering pipe, wherein said executing the filtering pipe comprises filtering parameters for one or more methods of the one or more active content files prior to executing the one or more methods to generate active content for the content page.

18. The method of claim 17, further comprising:

prior to said downloading the one or more active content files:

downloading, in response to a request for a template to the particular active content endpoint, a template specifying the one or more active content files and specifying method names of the methods of the active content files to be called and parameters to the methods, wherein the filtering pipe obtains the method names and parameters specified in the template in order to filter the parameters prior to the methods executing at the client application.

19. The method of claim 17, further comprising:

downloading, in response to a request for filtering methods to the particular active content endpoint, the filtering methods;

downloading, in response to a request for a filtering pipe configuration file to the particular active content endpoint, the filtering pipe configuration file; and wherein said executing the filtering pipe comprises, for each given method of the methods of the active content files:

examining the filtering pipe configuration file to determine a filtering method to apply for the given method to be invoked;

calling the determined filtering method to filter parameters for the given method to generate a filtered set of parameters; and invoking the given method with the filtered set of parameters.

20. The method of claim 19, wherein the determined filtering method, in response to being called with a method identifier and a suspect set of parameters, performs:

applying a whitelist filter to the suspect set of parameters, wherein the whitelist filter is defined based at least on a type of parameters expected for a method corresponding to the method identifier, or identifying one or more portions of the suspect set of parameters interpretable by the client application as active content and encode the identified one or more portions to not be interpretable by the client application as active content.

* * * * *